US012777233B2

(12) United States Patent
Stowell et al.

(10) Patent No.: US 12,777,233 B2
(45) Date of Patent: Oct. 27, 2026

(54) APPLICATION-LEVEL CONTENT CONTROL FOR DIRECT-TO-CELL SATELLITE COVERAGE

(71) Applicants: AT&T Mobility II LLC, Atlanta, GA (US); AT&T Intellectual Property I, L.P., Atlanta, GA (US)

(72) Inventors: Nathan Stowell, Lake Stevens, WA (US); Zhengyi Zhou, Chappaqua, NY (US); Rashmi Palamadai, Naperville, IL (US); Yupeng Jia, South Pasadena, CA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 9 days.

(21) Appl. No.: 19/096,819

(22) Filed: Apr. 1, 2025

(65) Prior Publication Data

US 2026/0303924 A1 Oct. 1, 2026

(51) Int. Cl.
*H04N 21/61* (2011.01)
*H04N 21/258* (2011.01)

(52) U.S. Cl.
CPC ... *H04N 21/6143* (2013.01); *H04N 21/25891* (2013.01)

(58) Field of Classification Search
CPC ..................... H04N 21/6143; H04N 21/25891
See application file for complete search history.

(56) References Cited

U.S. PATENT DOCUMENTS

2009/0029644 A1* 1/2009 Sue .................... H04N 21/2665 725/63
2010/0251304 A1* 9/2010 Donoghue ......... H04N 21/4755 725/46
2025/0392906 A1* 12/2025 Dasher .................. H04W 12/03
2026/0067645 A1* 3/2026 Lu ...................... H04B 7/18558

* cited by examiner

*Primary Examiner* — Gigi L Dubasky
(74) *Attorney, Agent, or Firm* — Guntin & Gust, PLC; Andrew Gust

(57) ABSTRACT

Application-level content control for direct-to-cell satellite coverage can include receiving a content delivery request that includes a request to provide content associated with an application hosted by an application server to a user device; obtaining a user profile associated with the user device and including content rules that define how the content is delivered to the user device when connected to a direct-to-cell satellite network connection; determining, if the content associated with the application is high priority content; if a determination is made that the content is the high priority content, determining content delivery parameters based on the content rules, the content delivery parameters including delivering the content associated with the application in an original format or in a modified format; and delivering the content associated with the application to the user device while the user device is connected to the direct-to-cell satellite network connection.

20 Claims, 11 Drawing Sheets

FIG. 1

APPLICATION-LEVEL CONTENT CONTROL FOR DIRECT-TO-CELL SATELLITE COVERAGE

BACKGROUND

Some modern computing devices such as smartphones, smartwatches, vehicle computing systems, and the like, can include multiple transceivers for conducting communications over one or more networks. At some times, tracking what network a device is communicating with can be complicated, and because network conditions can change rapidly, it may be difficult for a user to stay informed about current connections, connection statuses, and/or connection options at any given time.

SUMMARY

The present disclosure is directed to application-level content control for direct-to-cell satellite coverage. A user device can be configured to monitor one or more network connections of the user device and to detect a change in a network connection of the user device. In some embodiments, the user device can detect the user device connecting to a network connection associated with a direct-to-cell satellite network as a primary network connection, where no other backup network connection is available. Thus, the user device may detect a limited-connectivity direct-to-satellite connection as its primary and only network connection. The user device can update a user interface and capture (and/or create) device data that can include identity data that can identify the user device and/or a user thereof, connection data that can identify the current network connection(s) and/or status thereof for the user device, and/or other data included in the device data in some embodiments (e.g., user input obtained via one or more user interfaces provided at the user device). The user device can provide the device data to the coverage management service. The coverage management service can generate and/or update one or more user profiles associated with the user device based on the device data, thereby maintaining a current status of the network connection of the user device. The user device or other devices also can communicate with the coverage management service to create one or more content rules (e.g., profile-specific rules that can govern when, if, and/or how content will be provided by an application hosted and/or executed by an application server when the user device is connected to a limited-connectivity direct-to-cell satellite connection), application profiles (e.g., application-specific rules that can govern when, if, and/or how content will be provided by an application hosted and/or executed by an application server when the user device is connected to a limited-connectivity direct-to-cell satellite connection), identity information associated with the user device, the connection information for the user device, other information, and the like.

The user device can generate a request for content from the application hosted by the application server, or some other device, user, or entity may attempt to provide content to the user device (e.g., send video, attempt to establish a video call, send audio, combinations thereof, or the like). As such, the content can include almost any sort of data including, but not limited to, data files, audio files, video files, image files, data streams, application data and/or application data streams, and the like. The server computer and/or the application server can act on the content request and provide content communications to the user device, the content communications including notifications, content, or other information as appropriate. The content communications can include the content requested by the user device, or indications (e.g., notifications) that the delivery of the content has been denied (e.g., the content delivery may be blocked or delayed), that content may be modified, or the like. The user device can create and/or present user interfaces for communicating regarding the content, for obtaining input relating to the content (e.g., input from a user indicating that content requests be cancelled, that modified content be obtained instead of the requested content, that content requests be delayed, that other users or devices be updated, combinations thereof, or the like). It should be understood that this example embodiment is illustrative, and therefore should not be construed as being limiting in any way.

When the user device is connected to a limited-connectivity direct-to-cell satellite connection (e.g., a connection provided by the direct-to-cell satellite network with no backup connection), the server computer and/or the application server can be configured to manage content delivery based on one or more user profiles. In particular, the server computer and/or the application server can receive a content request (directly or related) from the user device, and can obtain the user profile associated with the user device. Based on analyzing the content request and the user profile for the user device, the server computer and/or the application server can determine if the content should be blocked, allowed in the original form, delayed, provided in a modified form, or the like. The server computer and the application server can be configured, in some embodiments, to determine if the requested content is high priority. As used herein, "high priority" content can relate to an emergency condition, include time-sensitive content, or the like, as illustrated and described herein. High priority content may be delivered in the original form, modified in certain ways, substituted, or the like, even where content delivery rules may suggest the blocking or delaying of the content. If the content is determined to be "high priority," content delivery parameters can be determined for the content. The content delivery parameters can be determined based on the content rules (of the user profile) and can define, for high priority content, if the content is to be provided in its original form, modified to consume less data, substituted for in some manner, or the like. In some embodiments, the delivery parameters can include, but are not limited to, reducing resolution of the content, reducing audio sampling rates of the content, cropping the content, trimming (e.g., shortening the duration of video or audio) the content, providing a transcript of the content (e.g., a video transcript), combinations thereof, or the like. It should be understood that this example embodiment is illustrative, and therefore should not be construed as being limiting in any way.

According to various embodiments of the concepts and technologies disclosed herein, the delivery parameters can be adjusted (e.g., based on content communications from the user device including notifications to and user input from the user device obtained via user interfaces presented at the user device). Devices attempting to send the content to the user device can be updated in some embodiments, and best effort content delivery can be provided for high priority content. If the content is not "high priority," the content rules can be applied to the content delivery request and delivery of the content may be blocked or delayed (or modified). Thus, content delivery can be managed in various manners, as illustrated and described herein.

According to one aspect of the concepts and technologies disclosed herein, a system is disclosed. The system can include a processor and a memory. The memory can store computer-executable instructions that, when executed by the processor, cause the processor to perform operations. The operations can include receiving a content delivery request including a request to provide content associated with an application to a user device, the application being hosted by an application server; and obtaining a user profile associated with the user device. The user profile can include content rules that define how the content associated with the application is delivered to the user device when the user device is connected to a direct-to-cell satellite network connection. The operations further can include determining, based on the user profile, that the user device is connected to the direct-to-cell satellite network connection; determining, based on the user profile, if the content associated with the application is high priority content, and if a determination is made that the content is high priority content, determining content delivery parameters based on the content rules, the content delivery parameters including delivering the content associated with the application in an original format or in a modified format. The operations also can include delivering the content associated with the application to the user device while the user device is connected to the direct-to-cell satellite network connection.

In some embodiments, the operations can include determining that the content is not high priority content, applying the content rules to the content associated with the application, and managing delivery of the content associated with the application based on the content rules. Managing the delivery of the content can include delaying the delivery of the content until the user device is connected to a new network connection in addition to or instead of the direct-to-cell satellite network connection. In some embodiments, the content can include video, and the modified format can include a trimmed video or a cropped video. In some embodiments, the content can include video, and the modified format can include a single frame of the video.

In some embodiments, the computer-executable instructions, when executed by the processor, cause the processor to perform operations further including obtaining, from the user device, device data that can include identity data that identifies the user device and connection data that identifies a current network connection of the user device. The connection data can indicate that the user device currently has limited network connectivity and is connected to the direct-to-cell satellite network connection. The operations further can include generating, based on the device data, the user profile. The user profile can include the content rules and an application profile that defines content delivery for the application.

In some embodiments, determining the content delivery parameters can include providing, to the user device, a notification that the content is not to be delivered to the user device when the user device is connected to the direct-to-cell satellite network connection. The user device can generate and present a user interface at the user device based on the notification, and can obtain input via the user interface. Determining the content delivery parameters can further include obtaining, from the user device, the input. The input can be used to determine the content delivery parameters, and the content delivery parameters can include blocking the delivery of the content associated with the application, delaying delivery of the content associated with the application, or modifying the content associated with the application before delivery to the user device. In some embodiments, the computer-executable instructions, when executed by the processor, can cause the processor to perform operations further including obtaining, from a server computer, the content delivery request, the content delivery request being received at the server computer from the user device. The operations can further include requesting, from the server computer, the user profile and receiving the user profile in response to requesting the user profile.

According to another aspect of the concepts and technologies disclosed herein, a method is disclosed. The method can include receiving, at a server computer that includes a processor, a content delivery request including a request to provide content associated with an application to a user device, the application being hosted by an application server; and obtaining, by the processor, a user profile associated with the user device. The user profile can include content rules that define how the content associated with the application is delivered to the user device when the user device is connected to a direct-to-cell satellite network connection. The method further can include determining, by the processor and based on the user profile, that the user device is connected to the direct-to-cell satellite network connection; determining, by the processor and based on the user profile, if the content associated with the application is high priority content, if a determination is made that the content is high priority content, determining content delivery parameters based on the content rules, the content delivery parameters including delivering the content associated with the application in an original format or in a modified format. The method also can include delivering, by the processor, the content associated with the application to the user device while the user device is connected to the direct-to-cell satellite network connection.

In some embodiments, the method can include determining that the content is not high priority content, applying the content rules to the content associated with the application, and managing delivery of the content associated with the application based on the content rules. Managing the delivery of the content can include delaying the delivery of the content until the user device is connected to a new network connection in addition to or instead of the direct-to-cell satellite network connection. In some embodiments, the content can include video, and the modified format can include a trimmed video or a cropped video. In some embodiments, the content can include video, and the modified format can include a single frame of the video.

In some embodiments, the method further can include obtaining, from the user device, device data that can include identity data that identifies the user device and connection data that identifies a current network connection of the user device. The connection data can indicate that the user device currently has limited network connectivity and is connected to the direct-to-cell satellite network connection. The method further can include generating, based on the device data, the user profile. The user profile can include the content rules and an application profile that defines content delivery for the application.

In some embodiments, determining the content delivery parameters can include providing, to the user device, a notification that the content is not to be delivered to the user device when the user device is connected to the direct-to-cell satellite network connection. The user device can generate and present a user interface at the user device based on the notification, and can obtain input via the user interface. Determining the content delivery parameters can further include obtaining, from the user device, the input. The input can be used to determine the content delivery parameters, and the content delivery parameters can include blocking the delivery of the content associated with the application, delaying delivery of the content associated with the application, or modifying the content associated with the application before delivery to the user device. In some embodiments, the method further can include obtaining, from a server computer, the content delivery request, the content delivery request being received at the server computer from the user device. The method can further include requesting, from the server computer, the user profile and receiving the user profile in response to requesting the user profile.

According to yet another aspect of the concepts and technologies disclosed herein, a computer storage medium is disclosed. The computer storage medium can store computer-executable instructions that, when executed by a processor, cause the processor to perform operations. The operations can include receiving a content delivery request including a request to provide content associated with an application to a user device, the application being hosted by an application server; and obtaining a user profile associated with the user device. The user profile can include content rules that define how the content associated with the application is delivered to the user device when the user device is connected to a direct-to-cell satellite network connection. The operations further can include determining, based on the user profile, that the user device is connected to the direct-to-cell satellite network connection; determining, based on the user profile, if the content associated with the application is high priority content, and if a determination is made that the content is high priority content, determining content delivery parameters based on the content rules, the content delivery parameters including delivering the content associated with the application in an original format or in a modified format. The operations also can include delivering the content associated with the application to the user device while the user device is connected to the direct-to-cell satellite network connection.

In some embodiments, the operations can include determining that the content is not high priority content, applying the content rules to the content associated with the application, and managing delivery of the content associated with the application based on the content rules. Managing the delivery of the content can include delaying the delivery of the content until the user device is connected to a new network connection in addition to or instead of the direct-to-cell satellite network connection. In some embodiments, the content can include video, and the modified format can include a trimmed video or a cropped video. In some embodiments, the content can include video, and the modified format can include a single frame of the video.

In some embodiments, the computer-executable instructions, when executed by the processor, cause the processor to perform operations further including obtaining, from the user device, device data that can include identity data that identifies the user device and connection data that identifies a current network connection of the user device. The connection data can indicate that the user device currently has limited network connectivity and is connected to the direct-to-cell satellite network connection. The operations further can include generating, based on the device data, the user profile. The user profile can include the content rules and an application profile that defines content delivery for the application.

In some embodiments, determining the content delivery parameters can include providing, to the user device, a notification that the content is not to be delivered to the user device when the user device is connected to the direct-to-cell satellite network connection. The user device can generate and present a user interface at the user device based on the notification, and can obtain input via the user interface. Determining the content delivery parameters can further include obtaining, from the user device, the input. The input can be used to determine the content delivery parameters, and the content delivery parameters can include blocking the delivery of the content associated with the application, delaying delivery of the content associated with the application, or modifying the content associated with the application before delivery to the user device. In some embodiments, the computer-executable instructions, when executed by the processor, can cause the processor to perform operations further including obtaining, from a server computer, the content delivery request, the content delivery request being received at the server computer from the user device. The operations can further include requesting, from the server computer, the user profile and receiving the user profile in response to requesting the user profile.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
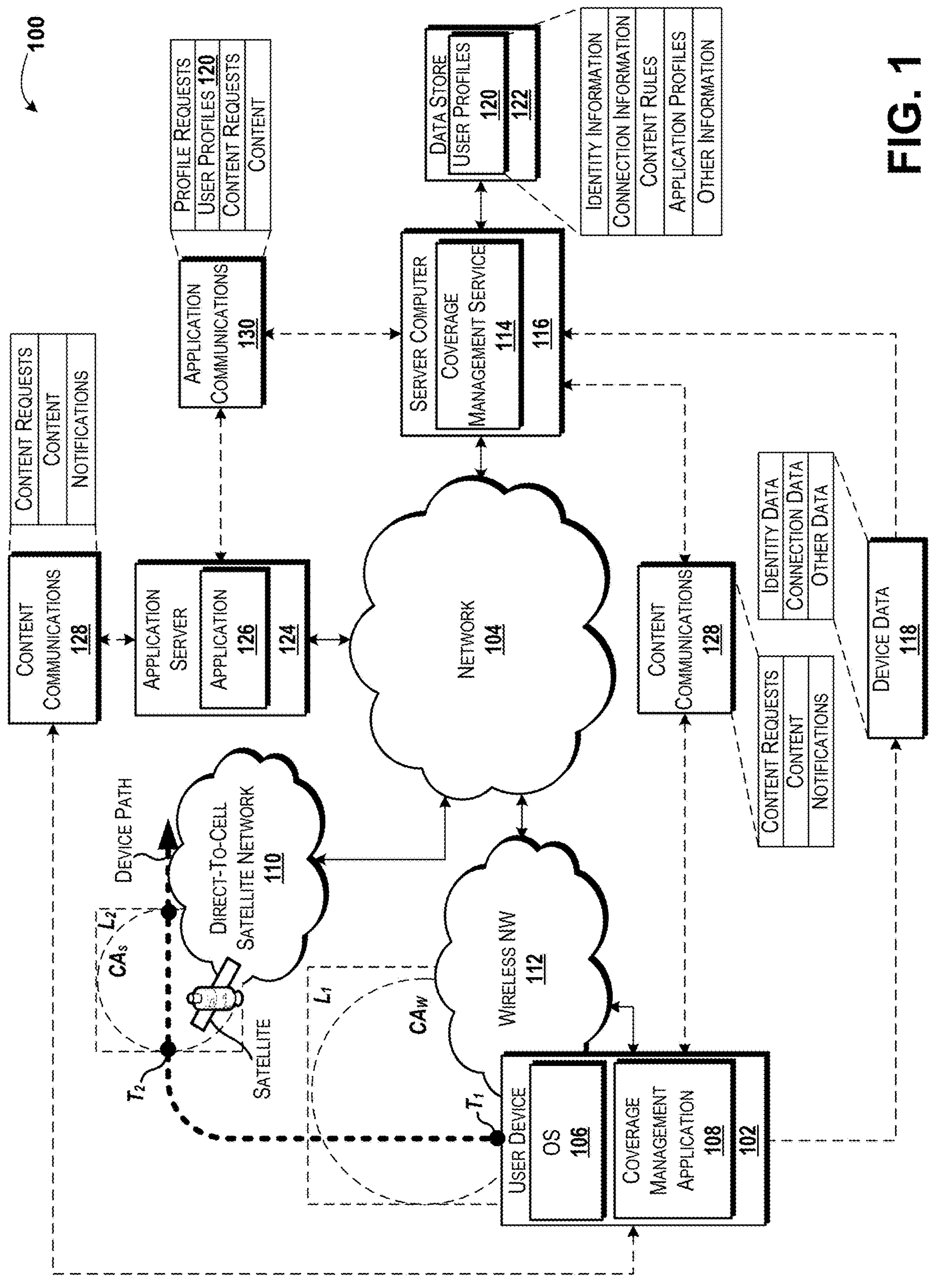
FIG. 1 is a system diagram illustrating an illustrative operating environment for various embodiments of the concepts and technologies described herein.

The following detailed description is directed to application-level content control for direct-to-cell satellite coverage. A user device can be configured to monitor one or more network connections of the user device and to detect a change in a network connection of the user device. In some embodiments, the user device can detect the user device connecting to a network connection associated with a direct-to-cell satellite network as a primary network connection, where no other backup network connection is available. Thus, the user device may detect a limited-connectivity direct-to-satellite connection as its primary and only network connection. The user device can update a user interface and capture (and/or create) device data that can include identity data that can identify the user device and/or a user thereof, connection data that can identify the current network connection(s) and/or status thereof for the user device, and/or other data included in the device data in some embodiments (e.g., user input obtained via one or more user interfaces provided at the user device). The user device can provide the device data to the coverage management service. The coverage management service can generate and/or update one or more user profiles associated with the user device based on the device data, thereby maintaining a current status of the network connection of the user device. The user device or other devices also can communicate with the coverage management service to create one or more content rules (e.g., profile-specific rules that can govern when, if, and/or how content will be provided by an application hosted and/or executed by an application server when the user device is connected to a limited-connectivity direct-to-cell satellite connection), application profiles (e.g., application-specific rules that can govern when, if, and/or how content will be provided by an application hosted and/or executed by an application server when the user device is connected to a limited-connectivity direct-to-cell satellite connection), identity information associated with the user device, the connection information for the user device, other information, and the like.

The user device can generate a request for content from the application hosted by the application server, or some other device, user, or entity may attempt to provide content to the user device (e.g., send video, attempt to establish a video call, send audio, combinations thereof, or the like). As such, the content can include almost any sort of data including, but not limited to, data files, audio files, video files, image files, data streams, application data and/or application data streams, and the like. The server computer and/or the application server can act on the content request and provide content communications to the user device, the content communications including notifications, content, or other information as appropriate. The content communications can include the content requested by the user device, or indications (e.g., notifications) that the delivery of the content has been denied (e.g., the content delivery may be blocked or delayed), that content may be modified, or the like. The user device can create and/or present user interfaces for communicating regarding the content, for obtaining input relating to the content (e.g., input from a user indicating that content requests be cancelled, that modified content be obtained instead of the requested content, that content requests be delayed, that other users or devices be updated, combinations thereof, or the like). It should be understood that this example embodiment is illustrative, and therefore should not be construed as being limiting in any way.

When the user device is connected to a limited-connectivity direct-to-cell satellite connection (e.g., a connection provided by the direct-to-cell satellite network with no backup connection), the server computer and/or the application server can be configured to manage content delivery based on one or more user profiles. In particular, the server computer and/or the application server can receive a content request (directly or related) from the user device, and can obtain the user profile associated with the user device. Based on analyzing the content request and the user profile for the user device, the server computer and/or the application server can determine if the content should be blocked, allowed in the original form, delayed, provided in a modified form, or the like. The server computer and the application server can be configured, in some embodiments, to determine if the requested content is high priority. As used herein, "high priority" content can relate to an emergency condition, include time-sensitive content, or the like, as illustrated and described herein. High priority content may be delivered in the original form, modified in certain ways, substituted, or the like, even where content delivery rules may suggest the blocking or delaying of the content. If the content is determined to be "high priority," content delivery parameters can be determined for the content. The content delivery parameters can be determined based on the content rules (of the user profile) and can define, for high priority content, if the content is to be provided in its original form, modified to consume less data, substituted for in some manner, or the like. In some embodiments, the delivery parameters can include, but are not limited to, reducing resolution of the content, reducing audio sampling rates of the content, cropping the content, trimming (e.g., shortening the duration of video or audio) the content, providing a transcript of the content (e.g., a video transcript), combinations thereof, or the like. It should be understood that this example embodiment is illustrative, and therefore should not be construed as being limiting in any way.

According to various embodiments of the concepts and technologies disclosed herein, the delivery parameters can be adjusted (e.g., based on content communications from the user device including notifications to and user input from the user device obtained via user interfaces presented at the user device). Devices attempting to send the content to the user device can be updated in some embodiments, and best effort content delivery can be provided for high priority content. If the content is not "high priority," the content rules can be applied to the content delivery request and delivery of the content may be blocked or delayed (or modified). Thus, content delivery can be managed in various manners, as illustrated and described herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for application-level content control for direct-to-cell satellite coverage will be described, according to an illustrative embodiment. The operating environment 100 shown in FIG. 1 includes a user device 102. The user device 102 can operate in communication with and/or as part of one or more communications networks such as, for example, a communications network ("network") 104, though this is not necessarily the case in all embodiments. As will be further explained herein, the network 104 can be accessed in various embodiments by one or more other networks, portals, or the like. Similarly, the user device 102 may connect to the network 104 directly, through or via these other networks, portals, or the like in various embodiments. These and other aspects of the operating environment 100 will be explained in more detail hereinbelow after introducing the various components of the operating environment 100.

According to various embodiments, the functionality of the user device 102 may be provided by one or more mobile telephones or smartphones, laptop computers, tablet computers, vehicle computing systems, other computing systems, and the like. It should be understood that the functionality of the user device 102 may be provided by a single device, by two or more similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can be configured to execute an operating system 106 and one or more application programs such as, for example, a coverage management application 108. The operating system 106 can include a computer program that can control the operation of the user device 102. The coverage management application 108 can include an executable program that can be configured to execute on top of the operating system 106 to provide various functions as illustrated and described herein for application-level content control for direct-to-cell satellite coverage as illustrated and described herein.

In various embodiments, the coverage management application 108 can be configured to detect one or more network connections of the user device 102; to update one or more entities regarding the one or more network connections of the user device 102 (as will be illustrated and described herein in more detail below); to receive one or more notifications and update user interfaces based on those notifications; combinations thereof; or the like. In the illustrated embodiment shown in FIG. 1, the user device 102 can be configured to communicate with the network 104 directly and/or through a direct-to-cell satellite network 110; a cellular network and/or other wireless network such as a WiFi network (hereinafter referred to as a "wireless network") 112; a vehicle-to-vehicle or other peer-to-peer network; other networks; combinations thereof; or the like.

As is generally understood, capabilities (e.g., bandwidth, latency, upload speed, download speed, etc.) of network connections associated with these networks, subnetworks, and/or other networking connections such as, for example, the network 104, the direct-to-cell satellite network 110, the wireless network 112, or the like, can vary in general, based on time and/or proximity of the user device 102 to hardware associated with these connections, and/or based on other factors. According to various embodiments of the concepts and technologies disclosed herein, the coverage management application 108 can be configured to create, update, and use information that indicates how the user device 102 is connected to one or more of these networks to provide application-level content delivery. These and other functions of the coverage management application 108 will be illustrated and described herein in more detail.

According to various embodiments, the user device 102 can connect to one or more networks and/or subnetworks at various times. In the illustrated example embodiment shown in FIG. 1, the user device 102 can connect to the wireless network 112 at a first time $T_1$ and while located at or in proximity to a first area or geographic location (hereinafter first location $L_1$) such as a home, a business, a vehicle, combinations thereof, or the like. The user device 102 can be configured to access the network 104 and/or other networks via the wireless network 112 at various times and/or locations including, but not limited to, the first time $T_1$ and first location $L_1$. In various embodiments, the wireless network 112 can have an associated wireless network coverage area $CA_W$ that can correspond to a communication range in which the user device 102 can communicate with the wireless network 112 and/or hardware thereof such as a radio unit ("RU"). In various embodiments of the concepts and technologies disclosed herein, the wireless network coverage area $CA_W$ can partially overlap and/or can be encompassed within boundaries of the first location $L_1$, though this is not necessarily the case in all embodiments. As such, it should be understood that this example embodiment is illustrative, and therefore should not be construed as being limiting in any way.

The user device 102 also can be configured to access the wireless network 112 (e.g., a cellular network or the like) using cellular technology as is generally understood. For example, the user device 102 can be configured to communicate with the wireless network 112 to negotiate a connection and/or to be provisioned with cellular network connectivity using a cellular transceiver and/or other functionality as is generally understood. The user device 102 also can be configured to connect to the direct-to-cell satellite network 110 using its cellular transceiver and/or other hardware. It should be understood that this example embodiment is illustrative, and therefore should not be construed as being limiting in any way.

According to various embodiments of the concepts and technologies disclosed herein, the coverage management application 108 can be configured to detect one or more network connections between the user device 102 and the one or more networks 104, 110, 112; to communicate with other entities relating to the one or more network connections of the user device 102; to create and/or update user interfaces at the user device 102 to reflect current and/or future network connections and/or other information as illustrated and described herein; to perform other functions; combinations thereof; or the like. In various embodiments, for example, the coverage management application 108 can be configured to monitor one or more transceivers and/or other hardware of the user device 102 (e.g., a WiFi transceiver, a Bluetooth transceiver, a cellular transceiver, a physical connection port, or the like) to determine and/or identify one or more network connections currently available and/or active to the user device 102. Because this information can be obtained by the coverage management application 108 in additional and/or alternative manners (e.g., reporting mechanisms, or the like), it should be understood that this example embodiment is illustrative, and therefore should not be construed as being limiting in any way. The coverage management application 108 also can be configured to report the connections of the user device 102 to one or more other entities, as will be explained in more detail herein.

In particular, as shown in FIG. 1, the user device 102 can be configured (e.g., via execution of the coverage management application 108) to communicate with a coverage management service 114. The functionality of the coverage management service 114 can be provided by an application, program, module, service, or the like, which can be hosted and/or executed by a computing device such as a server computer 116. In various embodiments, the functionality of the server computer 116 can be provided by an application server, a web server, or the like. The functionality of the server computer 116 may be provided by a single device, by two or more similar devices, and/or by two or more dissimilar devices (e.g., by a single server computer, by a cloud-based server computer, by one or more virtual resources, or the like). For purposes of describing the concepts and technologies disclosed herein, the server computer 116 is described herein as an application server that hosts the coverage management service 114. It should be understood that this example embodiment is illustrative, and therefore should not be construed as being limiting in any way.

In various embodiments of the concepts and technologies disclosed herein, the coverage management service 114 can determine what connection(s) are active at the user device 102 based on device data 118, which can be obtained from the user device 102 at various times. In some other embodiments, the coverage management service 114 can be configured to obtain information associated with the networks 104, 110, 112 from network monitors, network controls, reporting mechanisms, combinations thereof, or the like. As such, it should be understood that the illustrated embodiment is illustrative and therefore should not be construed as being limiting in any way. Based on the device data 118 or other information obtained by the coverage management service 114, the coverage management service 114 can be configured to identify one or more networks and/or network resources connected to by the user device 102 at any particular time. It should be understood that this example embodiment is illustrative, and therefore should not be construed as being limiting in any way.

For example, as shown in FIG. 1, the user device 102 may not be stationary and may move along a device path at some times. In particular, the user device 102 may correspond to a smartphone or an automobile computing system that moves along the device path. The user device 102 can enter and/or be located at the first location $L_1$ (and can be within a wireless network coverage area $CA_W$) at the first time $T_1$. The user device 102 can depart from the first location $L_1$ (and the wireless network coverage area $CA_W$) at some time and may move along the device path. The user device 102 may enter and/or may be located at the second location $L_2$ (and within a satellite coverage area CAs of a satellite of the direct-to-cell satellite network 110) at a second time $T_2$. Thus, it can be appreciated from the example embodiment that the user device 102 may connect to the wireless network 112 at a first time $T_1$ and the direct-to-cell satellite network 110 at a second time $T_2$. It should be understood that this example embodiment is illustrative, and therefore should not be construed as being limiting in any way.

Connection information associated with the user device 102 (e.g., information identifying what network the user device 102 is connected to at a particular time, connection parameters, and the like) can be collected by the coverage management application 108 and reported to the coverage management service 114 as part of the device data 118. The reporting of the device data 118 by the user device 102 can occur in real-time (e.g., as connections change), proactively (e.g., before the connections change), at other times, combinations thereof, or the like. According to various embodiments of the concepts and technologies disclosed herein, the device data 118 can include, but is not limited to, identity data, connection data, and/or other data for and/or associated with the user device 102. It should be understood that this example embodiment is illustrative, and therefore should not be construed as being limiting in any way.

According to various embodiments of the concepts and technologies disclosed herein, the identity data can identify the device itself (e.g., the user device 102) and/or a user thereof. Thus, for example, the identity data can include, but is not limited to, a device identifier such as an International Mobile Subscriber Identity ("IMSI"), an International Mobile Equipment Identity ("IMEI"), a Permanent Equipment Identifier ("PEI"), a media access control identifier ("MAC ID"), a serial number, an Internet protocol ("IP") address, a web identifier ("WebID"), additional and/or alternative device identifiers, combinations thereof, or the like. The identity data also can identify a user of the device (e.g., the user device 102) such as a login, name, email address, a phone number, a unique identifier, combinations thereof, or the like. Because other information can identify devices (e.g., the user device 102) and/or users thereof, it should be understood that these example embodiments are illustrative, and therefore should not be construed as being limiting in any way.

The connection data can identify, for the user device 102, one or more networks or network connections to and/or with which the device (e.g., the user device 102) is connected and/or communicates. In various embodiments of the concepts and technologies disclosed herein, the user device 102 can capture connection information by, for example, monitoring activity of one or more transceivers of the user device 102, with an active transceiver indicating that a network connection exists and/or is being used. In some embodiments, the connection data can be obtained from other entities by the user device 102 (e.g., from a network reporting device, etc.). In any case, it can be appreciated that the coverage management application 108 can be configured to collect and report the device data 118 to the coverage management service 114 in various embodiments. It should be understood that this example embodiment is illustrative, and therefore should not be construed as being limiting in any way.

The other data can include, for example, contextual information obtained from the user device 102 and/or applications or services used by and/or accessed by the user device 102; content download preferences and/or rules for the user device 102 and/or one or more users or other parties or entities associated therewith; location data such as a current or expected geographic location associated with the user device 102; motion data that can define motion and/or movements of the user device 102; historical usage data associated with the user device 102 and/or various network connections; or the like. It can be appreciated that the other data can include other information that can be used in some embodiments to project a location of the user device 102 at some time in the future and/or for other purposes. It should be understood that these example embodiments are illustrative, and therefore should not be construed as being limiting in any way.

Based on the device data 118 and/or other information such as default settings or configurations, the coverage management service 114 can be configured to create, update, maintain, and/or modify one or more user profiles 120. According to various embodiments of the concepts and technologies disclosed herein, the user profiles 120 can be stored and/or hosted at a data store 122. The functionality of the data store 122 can be provided by one or more databases, server computers, data storage and/or host resources, other computing systems, and the like. In the illustrated embodiments, the data store 122 can be provided by a data server. In some embodiments, the data store 122 can correspond to a home subscriber server ("HSS") and/or the like. It should be understood that this example embodiment is illustrative, and therefore should not be construed as being limiting in any way.

The user profiles 120 can include one or more data records, files, or other data structures for one or more users such as, for example, the user device 102 and/or a user thereof. A user profile 120 can include, for example, identity information (e.g., a device identifier and/or user identifier) for a particular user or device (e.g., the user device 102 and/or a user thereof); connection information, which can represent or identify one or more active network connections for a device associated with the user profile 120 (e.g., the user device 102); content rules, which can define one or more rules for providing content to the user device 102 when the user device 102 is connected to a direct-to-cell satellite network 110 and/or at other times; application profiles, which can define rules and/or preferences for the user device 102 when interacting with one or more applications while connected to a direct-to-cell satellite network 110 and/or at other times; other information, combinations thereof, or the like. It can be appreciated that the user profiles 120 can include records for one or more or even all users associated with a particular network (e.g., the network 104, the direct-to-cell satellite network 110, the wireless network 112, or the like).

According to various embodiments of the concepts and technologies disclosed herein, the user profiles 120 can be created and updated by the coverage management service 114. The user profiles 120 also can be accessed by the coverage management service 114 to manage delivery of content to the user device 102 at various times. According to various embodiments of the concepts and technologies disclosed herein, the coverage management service 114 can be configured to determine, for a device such as the user device 102, one or more network connections that is available to the user device 102 at some time. Based on this information, the coverage management service 114 can be configured to take various steps such as, for example, managing delivery of content to the user device 102 via the current network connection (in some instances). In various embodiments, the coverage management service 114 can be configured to directly manage delivery of the content to the user device 102, and in some other embodiments the coverage management service 114 can be configured to direct other entities or devices to manage content delivery for the user device 102. Additionally, or alternatively, the coverage management service 114 can be configured to create, manage, use, and/or provide to other entities one or more application profiles for a particular device such as the user device 102. These and other functions of the coverage management service 114 will be illustrated and described in more detail hereinbelow.

According to various embodiments of the concepts and technologies disclosed herein, the coverage management service 114 can be configured receive or otherwise obtain device data 118 from the user device 102. It can be appreciated that the device data 118 can be provided to the server computer 116 at various times. In some embodiments, for example, the user device 102 can provide the device data 118 to the server computer 116 when a network connection of the user device 102 changes (e.g., from one network to another, to one network without a backup connection to the same network with a backup connection, to one network with a backup connection to the same network without a backup connection, from a prioritized connection to a non-prioritized connection, from two or more network connections to one or more network connections, and the like). Because other changes in network connectivity are possible and are contemplated, it should be understood that these example embodiments are illustrative, and therefore should not be construed as being limiting in any way. In some other embodiments, the user device 102 can provide the device data 118 to the server computer 116 at various times. For example, the user device 102 may provide the device data 118 to the server computer 116 at regular or irregular time intervals. In yet other embodiments, the user device 102 can provide the device data 118 to the server computer 116 when requested by the server computer 116 or other device or entity. In still other embodiments, the user device 102 can provide the device data 118 to the server computer 116 when a user or other entity of the user device 102 enters a command or option to provide the device data 118 to the server computer 116. Because the user device 102 can provide the device data 118 at additional and/or alternative times, it should be understood that these example embodiments are illustrative, and therefore should not be construed as being limiting in any way.

In some embodiments, the server computer 116 can be configured (e.g., via execution of the coverage management service 114) to receive or otherwise obtain the device data 118. The coverage management service 114 can analyze the device data 118 to determine an identity associated with the device data 118 (e.g., a user, device, or the like such as the user device 102 and/or a user associated therewith); to determine a connection information for the user device 102 such as a current network status of the user device 102 (e.g., what network the user device 102 is currently connected to); to obtain content rules and/or preferences for content delivery for the user device 102; to obtain one or more application profiles for the user device 102 and/or a user thereof; combinations thereof; or the like. The coverage management service 114 can use these and/or other types of information included in the device data 118 to create, store, and/or update a user profile 120 associated with the user device 102. As mentioned above, the user profile 120 stored at a data store 122 in some embodiments. It should be understood that this example embodiment is illustrative, and therefore should not be construed as being limiting in any way.

In some embodiments, the server computer 116 can be configured (e.g., via execution of the coverage management service 114) to receive or otherwise obtain the device data 118. The coverage management service 114 can analyze the device data 118 to determine an identity associated with the device data 118 (e.g., a user, device, or the like such as the user device 102 and/or a user associated therewith) and to determine if a user profile 120 associated with the identity exists in the user profiles 120. The server computer 116 can obtain the user profile 120 associated with the identity and determine (from analysis of the device data 118), a current network connection for the user device 102. The server computer 116 can update the user profile 120 with the current network connection for the user device 102 and determine, based on the device data 118, if the user device 102 is currently connected to a satellite associated with the direct-to-cell satellite network 110. In some embodiments, the connectivity provided by the direct-to-cell satellite network 110 may be limited in terms of latency, bandwidth, other functionality, and the like. Thus, the server computer 116 can be configured to determine if the user device 102 is connected to the direct-to-cell satellite network 110 for these and other reasons. It should be understood that this example embodiment is illustrative, and therefore should not be construed as being limiting in any way.

If the server computer 116 determines that the user device 102 is currently connected to the direct-to-cell satellite network 110, the server computer 116 can determine if the user profile 120 includes one or more rules, preferences, settings, configurations, or the like for managing content delivery to the user device 102 while connected to the direct-to-cell satellite network 110. It can be appreciated that the server computer 116 can make this determination by analyzing the user profile 120 and determining if content rules and/or application profiles have been specified and/or defined. If the server computer 116 determines that one or more content rules and/or application profiles have been specified and/or defined for the user device 102, the server computer 116 can be configured to manage content delivery for the user device 102, either directly and/or by commanding or requesting other devices to manage the content delivery. The managing of content delivery will be illustrated and described in more detail herein after introducing additional entities in the operating environment 100.

As shown in FIG. 1, the operating environment 100 can include one or more application servers 124 (one application server 124 is shown in FIG. 1 for simplicity), which can host an application 126. The functionality of the application server 124 may be provided by a single device, by two or more similar devices, and/or by two or more dissimilar devices (e.g., by a single server computer, by a cloud-based server computer, by one or more virtual resources, or the like). For purposes of describing the concepts and technologies disclosed herein, the application server 124 is described herein as an application server that operates on and/or in communication with the networks 104, 110, 112 and hosts the application 126. The functionality of the application 126 can be provided by an application, program, module, service, or the like, which can be executed by the application server 124 to provide content and/or services to the user device 102 and/or other users or entities. It should be understood that this example embodiment is illustrative, and therefore should not be construed as being limiting in any way.

The application 126 shown in FIG. 1 can correspond to almost any application including, but not limited to, messaging platforms, video calling services, audio calling services, voice-over-IP ("VoIP") services, video services, mail services, social networking services, websites, webapp services, combinations thereof, or the like. Thus, as is generally understood, the application 126 may generate content for delivery to a user of the application 126 (e.g., the user device 102) based on a request by the user device 102 (e.g., an application request, a call, or the like), based on a request by other devices, users, or other entities (e.g., another device calling the user device 102, sending the user device 102 data via a mail server, messaging platform, or the like), without any request by the user device 102 or other device, and/or at other times. In any event, the application server 124 can be configured to exchange, with the user device 102 and either directly and/or indirectly, content communications 128.

The content communications 128 can include, for example, content requests, content, and notifications. The content requests can include, for example, requests for content, which in some instances may be generated by the user device 102, though this is not necessarily the case in all embodiments. The content can include, for example, media such as images, video, audio, or the like; application data; data files; data streams; other forms of data or other content such as voice signals; combinations thereof; or the like. It can be appreciated that in various embodiments of the concepts and technologies disclosed herein, delivery of the content to the user device 102 may be less practical, for example, in cases where the user device 102 is connected only to a satellite connection such as a connection provided by a direct-to-cell satellite network 110. In these and other instances, delivery of the content may be managed by the coverage management service 114 and/or other applications or services. It should be understood that this example embodiment is illustrative, and therefore should not be construed as being limiting in any way.

The notifications can include updates or other forms of information that can be provided to the user device 102, the server computer 116, the application server 124, and/or other entities. The notifications can be used to generate user interfaces, to update statuses, and/or for other reasons. For example, if delivery of some content to the user device 102 is blocked, delayed, or otherwise modified, the user device 102 may be provided with a notification and the user device 102 may update a user interface to reflect this notification and/or may use the notification for other purposes. Because notifications may be used for other purposes, it should be understood that this example embodiment is illustrative, and therefore should not be construed as being limiting in any way.

In various embodiments of the concepts and technologies disclosed herein, the application server 124 also can be configured to communicate with the server computer 116 for various purposes. For example, the application server 124 and the server computer 116 may be configured to exchange application communications 130. The application communications 130 may be used by the application server 124 and/or the server computer 116 to enable the server computer 116 and/or the application server 124 to manage content delivery, as will be explained in more detail below. The application communications 130 can include, but are not limited to, profile requests, the user profiles 120, content requests, content, and/or other data and/or information (not shown in FIG. 1).

In some embodiments, the server computer 116 can be configured to receive a profile request from the application server 124. For example, a user device 102 or other device may request that content be obtained from or delivered to the user device 102 via the application server 124, and the application server 124 may be configured to obtain a user profile 120 from the server computer 116 to manage content delivery. The server computer 116 may identify the user profile 120 for the user device 102 and provide the user profile 120 to the user device 102. It should be understood that this example embodiment is illustrative, and therefore should not be construed as being limiting in any way.

In some other embodiments, the server computer 116 may be configured to receive content requests from the user device 102 in some instances such as, for example, when the user device 102 is connected to a direct-to-cell satellite connection, or the like. The server computer 116 can be configured to relay any such content requests to the application server 124 to enable the user device 102 or the server computer 116 to obtain the content from the application server 124. In yet other embodiments, the server computer 116 may provide the content to the user device 102 and the application server 124 may be configured to provide the content to the server computer 116 for providing to the user device 102. It should be understood that these example embodiments are illustrative, and therefore should not be construed as being limiting in any way.

In some embodiments, the server computer 116 can manage the content delivery for the user device 102 by directly receiving requests for content (e.g., content requests included in the content communications 128) and/or providing content to the user device 102 in response to those content requests. Thus, it can be appreciated that the server computer 116 can act as an intermediary for the user device 102 and the application server(s) 124. It should be understood that this example embodiment is illustrative, and therefore should not be construed as being limiting in any way. In some embodiments, the server computer 116 can be configured to obtain the content, from the application server 124 (or other source such as a content server), to determine if any modifications to the content should be made (e.g., if the content should be blocked, if a resolution of the content should be changed, and/or if any other changes should be made to the content), and to deliver the content to the user device 102. In some other embodiments, the server computer 116 can be configured to monitor content transfers between application servers 124 and/or other sources and the user device 102 or other recipients. Thus, it can be appreciated that the server computer 116 can be configured in some embodiments to directly manage content delivery. It should be understood that this example embodiment is illustrative, and therefore should not be construed as being limiting in any way.

In some other embodiments, the server computer 116 can manage the content delivery by communicating with one or more of the application servers 124, and the application servers 124 can manage the content directly. In particular, in some embodiments, the server computer 116 and the application server 124 can be configured to exchange application communications 130 as noted above. In some such embodiments, the application communications 130 can include, but are not limited to, profile requests (i.e., requests from the application servers 124 for user profiles 120 associated with a particular user or device such as the user device 102); the user profiles 120 that are responsive to the profile requests and/or other user profiles 120, content requests that can correspond to requests for particular instances of content such as videos, data files, streams, applications, or the like, which may be received in some embodiments by the server computer 116 and relayed or forwarded to the application server 124 and/or acted on by the server computer 116; content that is responsive to the content requests (e.g., provided to the server computer 116 to respond to the content requests in some embodiments); other data and/or information (not shown in FIG. 1). The application servers 124 can be configured to analyze the user profiles 120 to determine and/or apply the content rules and/or application profiles included in the user profiles 120 (or obtained in additional and/or alternative manners) for content associated with the user device 102, in some embodiments. Thus, the application servers 124 can be configured to manage content delivery, for example, by executing an application 126 or the like, and in some embodiments by applying data obtained from the server computer 116 such as the user profiles 120, and the like. It should be understood that this example embodiment is illustrative, and therefore should not be construed as being limiting in any way.

As such, it can be appreciated that the coverage management service 114 can be configured to create, maintain, serve, and/or use the user profiles 120 to manage content delivery for the user device 102 and/or other devices. The management of content delivery can occur at the coverage management service 114, at the application server(s) 124 (with or without data provided by the coverage management service 114 and/or with or without communications with the coverage management service 114), and/or at other devices or entities. It should be understood that these example embodiments are illustrative, and therefore should not be construed as being limiting in any way.

The coverage management service 114 also can be configured to perform other operations on the content. For example, the coverage management service 114 can be configured to analyze the content to determine a type of content (e.g., video(s), image(s), audio, application data, combinations thereof, or the like), a purpose of the content (e.g., entertainment, informational, medical information, emergency information, combinations thereof, or the like), uses for the information, combinations thereof, or the like. The coverage management service 114 therefore can include and/or can communicate with artificial intelligence and/or machine learning algorithms and/or applications for analyzing the content to determine these and/or other information associated with the content. The coverage management service 114 can use this analysis to determine, based on the content itself, if the content should be prioritized and/or treated as "high priority." Thus, it can be appreciated that content may be labeled "high priority" based on the content itself and not based on any device identifier, account identifier, user identifier, or the like. For example, a video for emergency medical assistance may be labeled high priority based on the content of the video relating to an emergency, and the content may therefore be labeled "high priority" by the coverage management service 114 regardless of the recipient or intended recipient for the content. It should be understood that this example embodiment is illustrative, and therefore should not be construed as being limiting in any way.

According to various embodiments of the concepts and technologies disclosed herein, the coverage management application 108 can be configured to communicate with the server computer 116 and/or the application server 124 to obtain content as illustrated and described herein (e.g., to access data generated by and/or exchanged with the application 126). The coverage management application 108 can receive, for example, one or more notifications from the coverage management service 114 and/or the application 126 as part of the content communications 128. The notifications can inform user device 102 that content requested by the user device 102 or directed to the user device 102 by others cannot be delivered due to a limited-connectivity connection (e.g., a direct-to-cell satellite connection provided by the direct-to-cell satellite network 110, or the like).

The user device 102 can be configured, e.g., by execution of the coverage management application 108, to generate and/or present a user interface at the user device 102 for informing a user of the user device 102 that the content delivery will be blocked, delayed, or may be modified (e.g., a low-resolution version may be available, a substitute may be available, or the like). Thus, the coverage management application 108 can be configured to communicate these and/or other conditions associated with the content at the user device 102 and/or to obtain input (for example, input from a user requesting a delay in delivery, requesting a preview or other modified version of the content, requesting communications with parties trying to contact the user device 102, combinations thereof, or the like). Other types of communications with the user device 102 will be illustrated and described herein, and creating, updating, and/or presenting user interfaces at the user device 102 to communicate these and other conditions, and to obtain input from a user relating to the content, will be illustrated and described herein. As such, it should be understood that these example embodiments are illustrative, and therefore should not be construed as being limiting in any way.

In practice, a user device 102 can be configured to monitor one or more network connections of the user device 102 and to detect a change in a network connection of the user device 102. In some embodiments, the user device 102 can detect the user device 102 connecting to a network connection associated with a direct-to-cell satellite network 110 as a primary network connection, where no other backup network connection is available. Thus, the user device 102 may detect a limited-connectivity direct-to-satellite connection as its primary and only network connection. The user device 102 can update a user interface and capture (and/or create) device data 118 that can include identity data that can identify the user device 102 and/or a user thereof, connection data that can identify the current network connection(s) and/or status thereof for the user device 102, and/or other data included in the device data 118 in some embodiments (e.g., user input obtained via one or more user interfaces provided at the user device 102). The user device 102 can provide the device data 118 to the coverage management service 114. The coverage management service 114 can generate and/or update one or more user profiles 120 associated with the user device 102 based on the device data 118, thereby maintaining a current status of the network connection of the user device 102. The user device 102 or other devices also can communicate with the coverage management service 114 to create one or more content rules (e.g., profile-specific rules that can govern when, if, and/or how content will be provided by an application 126 hosted and/or executed by an application server 124 when the user device 102 is connected to a limited-connectivity direct-to-cell satellite connection), application profiles (e.g., application-specific rules that can govern when, if, and/or how content will be provided by an application 126 hosted and/or executed by an application server 124 when the user device 102 is connected to a limited-connectivity direct-to-cell satellite connection), identity information associated with the user device 102, the connection information for the user device 102, other information, and the like.

The user device 102 can generate a request for content from the application 126 hosted by the application server 124, or some other device, user, or entity may attempt to provide content to the user device 102 (e.g., send video, attempt to establish a video call, send audio, combinations thereof, or the like). As such, the content can include almost any sort of data including, but not limited to, data files, audio files, video files, image files, data streams, application data and/or application data streams, and the like. The server computer 116 and/or the application server 124 can act on the content request and provide content communications 128 to the user device 102, the content communications 128 including notifications, content, or other information as appropriate. The content communications can include the content requested by the user device 102, or indications (e.g., notifications) that the delivery of the content has been denied (e.g., the content delivery may be blocked or delayed), that content may be modified, or the like. The user device 102 can create and/or present user interfaces for communicating regarding the content, for obtaining input relating to the content (e.g., input from a user indicating that content requests be cancelled, that modified content be obtained instead of the requested content, that content requests be delayed, that other users or devices be updated, combinations thereof, or the like). It should be understood that this example embodiment is illustrative, and therefore should not be construed as being limiting in any way.

When the user device 102 is connected to a limited-connectivity direct-to-cell satellite connection (e.g., a connection provided by the direct-to-cell satellite network 110 with no backup connection), the server computer 116 and/or the application server 124 can be configured to manage content delivery based on one or more user profiles 120. In particular, the server computer 116 and/or the application server 124 can receive a content request (directly or related) from the user device 102, and can obtain the user profile 120 associated with the user device 102. Based on analyzing the content request and the user profile 120 for the user device 102, the server computer 116 and/or the application server 124 can determine if the content should be blocked, allowed in the original form, delayed, provided in a modified form, or the like. The server computer 116 and the application server 124 can be configured, in some embodiments, to determine if the requested content is high priority. As used herein, "high priority" content can relate to an emergency condition, include time-sensitive content, or the like, as illustrated and described herein. High priority content may be delivered in the original form, modified in certain ways, substituted, or the like, even where content delivery rules may suggest the blocking or delaying of the content. If the content is determined to be "high priority," content delivery parameters can be determined for the content. The content delivery parameters can be determined based on the content rules (of the user profile 120) and can define, for high priority content, if the content is to be provided in its original form, modified to consume less data, substituted for in some manner, or the like. In some embodiments, the delivery parameters can include, but are not limited to, reducing resolution of the content, reducing audio sampling rates of the content, cropping the content, trimming (e.g., shortening the duration of video or audio) the content, providing a transcript of the content (e.g., a video transcript), combinations thereof, or the like. It should be understood that this example embodiment is illustrative, and therefore should not be construed as being limiting in any way.

According to various embodiments of the concepts and technologies disclosed herein, the delivery parameters can be adjusted (e.g., based on content communications 128 from the user device 102 including notifications to and user input from the user device 102 obtained via user interfaces presented at the user device 102). Devices attempting to send the content to the user device 102 can be updated in some embodiments, and best effort content delivery can be provided for high priority content. If the content is not "high priority," the content rules can be applied to the content delivery request and delivery of the content may be blocked or delayed (or modified). Thus, content delivery can be managed in various manners, as illustrated and described herein.

FIG. 1 illustrates one user device 102, one network 104, one direct-to-cell satellite network 110 having one satellite, one wireless network 112, one server computer 116, one data store 122, and one application server 124. It should be understood, however, that various implementations of the operating environment 100 can include one or more than one user device 102; one or more than one network 104; one or more than one direct-to-cell satellite network 110 (one or more of which may have one or more than one satellite); one or more than one wireless network 112; one or more than one server computer 116; zero, one, or more than one data store 122; and/or zero, one, or more than one application server 124. As such, the illustrated embodiment should be understood as being illustrative, and should not be construed as being limiting in any way.

Figure 2:
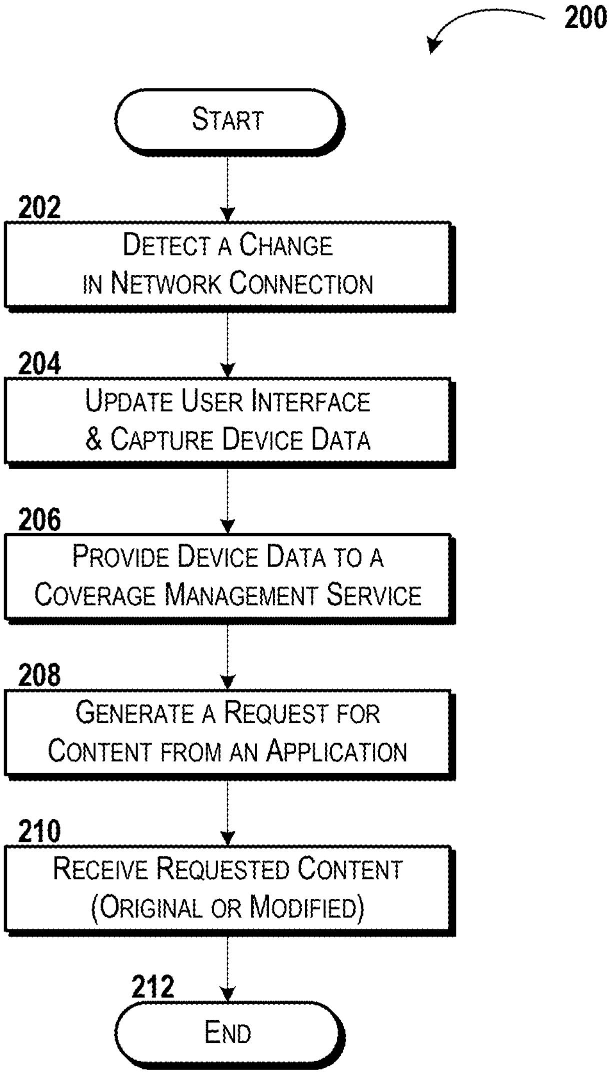
FIG. 2 is a flow diagram showing aspects of a method for obtaining content during direct-to-cell satellite coverage, according to an illustrative embodiment of the concepts and technologies described herein.

Turning now to FIG. 2, aspects of a method 200 for obtaining content during direct-to-cell satellite coverage will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102 and/or the server computer 116 to perform one or more operations and/or causing the processor to direct other components of the computing system or device to perform one or more of the operations.

For purposes of illustrating and describing the concepts of the present disclosure, the method 200 is described herein as being performed by the user device 102 via execution of one or more software modules such as, for example, the coverage management application 108. It should be understood that additional and/or alternative devices and/or network nodes can provide the functionality described herein via execution of one or more modules, applications, and/or other software including, but not limited to, the coverage management application 108. Thus, the illustrated embodiments are illustrative, and should not be viewed as being limiting in any way.

The method 200 begins at operation 202. At operation 202, the user device 102 can detect a change in a network connection of the user device 102. In operation 202, for example, the user device 102 can detect that the user device 102 has connected to a network connection other than a previous network connection, has connected to a network connection in addition to a previous network connection to which the user device 102 was connected, disconnected from one or more network connections to which the user device 102 was connected, or the like. In some embodiments, operation 202 can include the user device 102 connecting to a network connection associated with a direct-to-cell satellite network 110 as a primary network connection, as a backup network connection, or the like; the user device 102 connecting to a network connection associated with the wireless network 112 as a primary network connection, backup network connection, or the like; the user device 102 disconnecting from one or more network connections; combinations thereof; or the like.

Thus, operation 202 can include the user device 102 detecting any sort of connection to or disconnection from a network connection. In various embodiments, the network connection change detected in operation 202 can correspond to the user device 102 connecting to a network connection that can have limited connectivity such as a connection with the direct-to-cell satellite network 110 (e.g., limited in terms of latency, bandwidth, and the like as is the case for direct-to-cell satellite connections), and the user device 102 can determine that this connection exists with or without a backup network connection that has improved performance relative to the network connection with the direct-to-cell satellite network 110, for example, a cellular connection, a WiFi connection, or the like. It should be understood that this example embodiment is illustrative, and therefore should not be construed as being limiting in any way.

As such, it can be appreciated that operation 202 can correspond to the user device 102 detecting that the user device 102 has remained connected to a network connection with limited connectivity (e.g., a direct-to-cell satellite connection), but now has a primary or backup network connection that has improved performance relative to the direct-to-cell connection such as a cellular connection, a WiFi connection, or the like, in addition to the other changes illustrated and described herein. Because other changes to the network connection of the user device 102 can be detected by the user device 102 in operation 202, it should be understood that the above example embodiments are illustrative, and therefore should not be construed as being limiting in any way.

From operation 202, the method 200 can proceed to operation 204. At operation 204, the user device 102 can update a user interface and capture (and/or create) the device data 118. In particular, operation 204 can correspond to the user device 102 updating a user interface at the user device 102 (e.g., to show the new or changed network connection(s) detected in operation 202) and capturing the components of the device data 118 illustrated and described herein including, but not limited to, identity data that can identify the user device 102 and/or a user thereof, connection data that can identify the current network connection(s) and/or status thereof for the user device 102, and/or other data included in the device data 118 in some embodiments. Thus, operation 204 can include the user device 102 generating the device data 118 illustrated and described herein (e.g., due to the detected change in the network connection). It should be understood that this example embodiment is illustrative, and therefore should not be construed as being limiting in any way.

From operation 204, the method 200 can proceed to operation 206. At operation 206, the user device 102 can provide the device data 118 that was captured and/or created in operation 204 to the coverage management service 114 (and/or to the server computer 116 that hosts and/or executes the coverage management service 114). In various embodiments of the concepts and technologies disclosed herein, operation 206 can correspond to the user device 102 transmitting the device data 118 to the server computer 116, publishing the device data 118, releasing the device data 118, injecting the device data 118 into a data stream, combinations thereof, or the like. Because the user device 102 can provide and/or make available the device data 118 to the coverage management service 114 in additional and/or alternative manners, it should be understood that this example embodiment is illustrative, and therefore should not be construed as being limiting in any way.

From operation 206, the method 200 can proceed to operation 208. At operation 208, the user device 102 can generate a request for content from an application. For example, the user device 102 may request content from the application 126 hosted by the application server 124 in operation 208. Thus, it can be appreciated that the content requested in operation 208 can correspond to almost any sort of data including, but not limited to, data files, audio files, video files, image files, data streams, application data and/or application data streams, and the like. Thus, it can be appreciated that in various embodiments of the concepts and technologies disclosed herein, the content requested by the user device 102 may consume data from the application 126, and that if the user device 102 is currently connected to a limited-connectivity connection, providing this content may exceed current data connection abilities (or impact quality of service or the like). Thus, embodiments of the concepts and technologies disclosed herein can be configured to manage delivery of the content based on what network connection(s) the user device 102 is connected to, data needs of the application 126, and the like. As explained herein, the request for content from the application 126 can be provided by the user device 102 to the server computer 116, the application server 124, or the like. It should be understood that this example embodiment is illustrative, and therefore should not be construed as being limiting in any way.

From operation 208, the method 200 can proceed to operation 210. At operation 210, the user device 102 can receive content communications 128 from the application server 124, the server computer 116, or other devices or entities. It can be appreciated that in some instances, delivery of the content requested in operation 208 may be denied (e.g., the content delivery may be blocked or delayed by the server computer 116 and/or the application server 124), so the content communications 128 can communicate this to the user device 102. Thus, in operation 210, the user device 102 can also create and/or present user interfaces for communicating regarding the content, for obtaining input relating to the content (e.g., input from a user indicating that content requests be cancelled, that modified content be obtained instead of the requested content, that content requests be delayed, that other users or devices be updated, combinations thereof, or the like). Because other types of input at the user device 102 are illustrated and described herein, it should be understood that these example embodiments are illustrative, and therefore should not be construed as being limiting in any way.

According to various embodiments of the concepts and technologies disclosed herein, the content communications 128 received in operation 210 can include the content requested by the user device 102 in operation 208. For example, the content communications 128 received by the user device 102 in operation 210 can include the content that was requested, with the content being provided in operation 210 in its original format, in a modified content (e.g., content that has been modified from its original format), or the like. In various embodiments of the concepts and technologies disclosed herein, the modified content can be modified to consume less data (than the unmodified and/or original version of the data) when transmitted via one or more network connections. For example, if the content is video, the content may be modified by reducing the resolution of the video, by providing one frame of the video as a representation of the video, by reducing the frame rate of the video, by changing a compression and/or decompression algorithm (e.g., a "codec") used on the video, by trimming the video, by cropping the video, by modifying an audio sampling rate of the video, combinations thereof, or the like.

Because other types of content (e.g., application data, audio, images, data files, data streams, combinations thereof, or the like) can be provided in accordance with embodiments of the concepts and technologies disclosed herein, it should be understood that these example embodiments for video are illustrative, and therefore should not be construed as being limiting in any way. Additional details of modifying the content will be illustrated and described herein, particularly with reference to FIGS. 4 and 5. Because additional and/or alternative modifications to content are possible and are contemplated, it should be understood that the above examples and other example embodiments illustrated herein are illustrative, and therefore should not be construed as being limiting in any way.

From operation 210, the method 200 can proceed to operation 212. The method 200 can end at operation 212.

Figure 3:
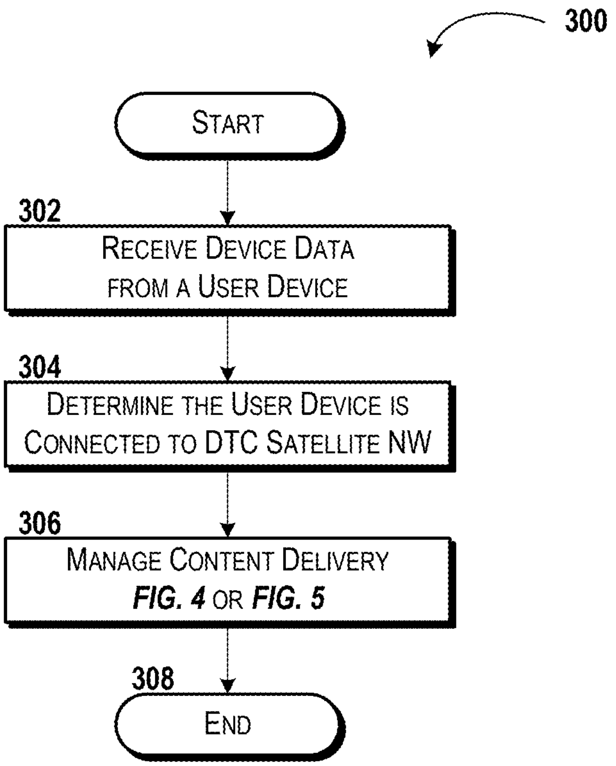
FIG. 3 is a flow diagram showing aspects of a method for providing content to a user device during direct-to-cell satellite coverage, according to an illustrative embodiment of the concepts and technologies described herein.

Turning now to FIG. 3, aspects of a method 300 for providing content to a user device during direct-to-cell satellite coverage will be described in detail, according to an illustrative embodiment. For purposes of illustrating and describing the concepts of the present disclosure, the method 300 is described herein as being performed by the server computer 116 via execution of one or more software modules such as, for example, the coverage management service 114. It should be understood that additional and/or alternative devices and/or network nodes can provide the functionality described herein via execution of one or more modules, applications, and/or other software including, but not limited to, the coverage management service 114. Thus, the illustrated embodiments are illustrative, and should not be viewed as being limiting in any way.

The method 300 begins at operation 302. At operation 302, the server computer 116 can receive device data 118 from the user device 102. According to various embodiments of the concepts and technologies disclosed herein, the user device 102 can be configured to send the device data 118 to the server computer 116 when a network connection change is detected at the user device 102, at regular and/or irregular time intervals, on request from the server computer 116 and/or other devices or entities, when the user device 102 detects certain network connection changes (e.g., connection to or disconnection from the direct-to-cell satellite network 110, when no backup connection exists, when bandwidth and/or latency drops below a defined threshold, combinations thereof, or the like), combinations thereof, or the like.

In some embodiments, the user device 102 can be configured to create and send the device data 118 to the server computer 116 under limited circumstances. In particular, the user device 102 can be configured, in some embodiments, to send the device data 118 to the server computer 116 only when the user device 102 detects the establishment of a connection with a direct-to-cell satellite network 110 with limited or no backup network connection, and/or when the user device 102 detects that a new network connection has been established as a primary or backup network after previously being connected only to a direct-to-cell satellite network 110 with limited or no backup network connection. Because the device data 118 can be provided to the server computer 116 in additional and/or alternative circumstances, it should be understood that these example embodiments are illustrative, and therefore should not be construed as being limiting in any way.

At operation 304, the server computer 116 can determine that the user device 102 is connected to a direct-to-cell satellite network 110 (and/or a network connection thereto). In particular, the server computer 116 can determine, in operation 304 a network status of the user device 102 and detect that a network connection of the user device 102 corresponds to a connection to a satellite associated with a direct-to-cell satellite network 110. In operation 304, for example, the server computer 116 can analyze the device data 118 to determine what network connections exist for the user device 102 at a current time, and as explained herein the device data 118 can indicate a current network connection of the user device 102. Thus, based on analysis of the device data 118, the server computer 116 can determine the current network connection of the user device 102. In some contemplated example embodiments of the concepts and technologies disclosed herein, for example, the server computer 116 may determine in operation 304 that the user device 102 is currently connected to a direct-to-cell satellite network 110 with no backup network connection or a direct-to-cell satellite network 110 with a limited backup connection. In either event, the server computer 116 may determine that the user device 102 currently has a network connection with limited connectivity. It should be understood that this example embodiment is illustrative, and therefore should not be construed as being limiting in any way.

From operation 304, the method 300 can proceed to operation 306. At operation 306, the server computer 116 can manage content delivery for the user device 102. As illustrated and described herein, some embodiments of operation 306 can correspond to the server computer 116 acting as gateway for content requests (from the user device 102) and content delivery (from the application server 124). In some other embodiments, operation 306 can correspond to the server computer 116 communicating with the application server 124 to enable the application server 124 to directly manage content delivery for the user device 102. In yet other embodiments, operation 306 can correspond to the server computer 116 communicating with the application server 124 to manage content delivery for the user device 102. These and other content delivery management approaches will be illustrated and described in more detail hereinbelow with reference to FIGS. 4 and 5. Because delivery of the content to the user device 102 can be managed in additional and/or alternative manners, it should be understood that these example embodiments are illustrative, and therefore should not be construed as being limiting in any way.

From operation 306, the method 300 can proceed to operation 308. The method 300 can end at operation 308.

Figure 4:
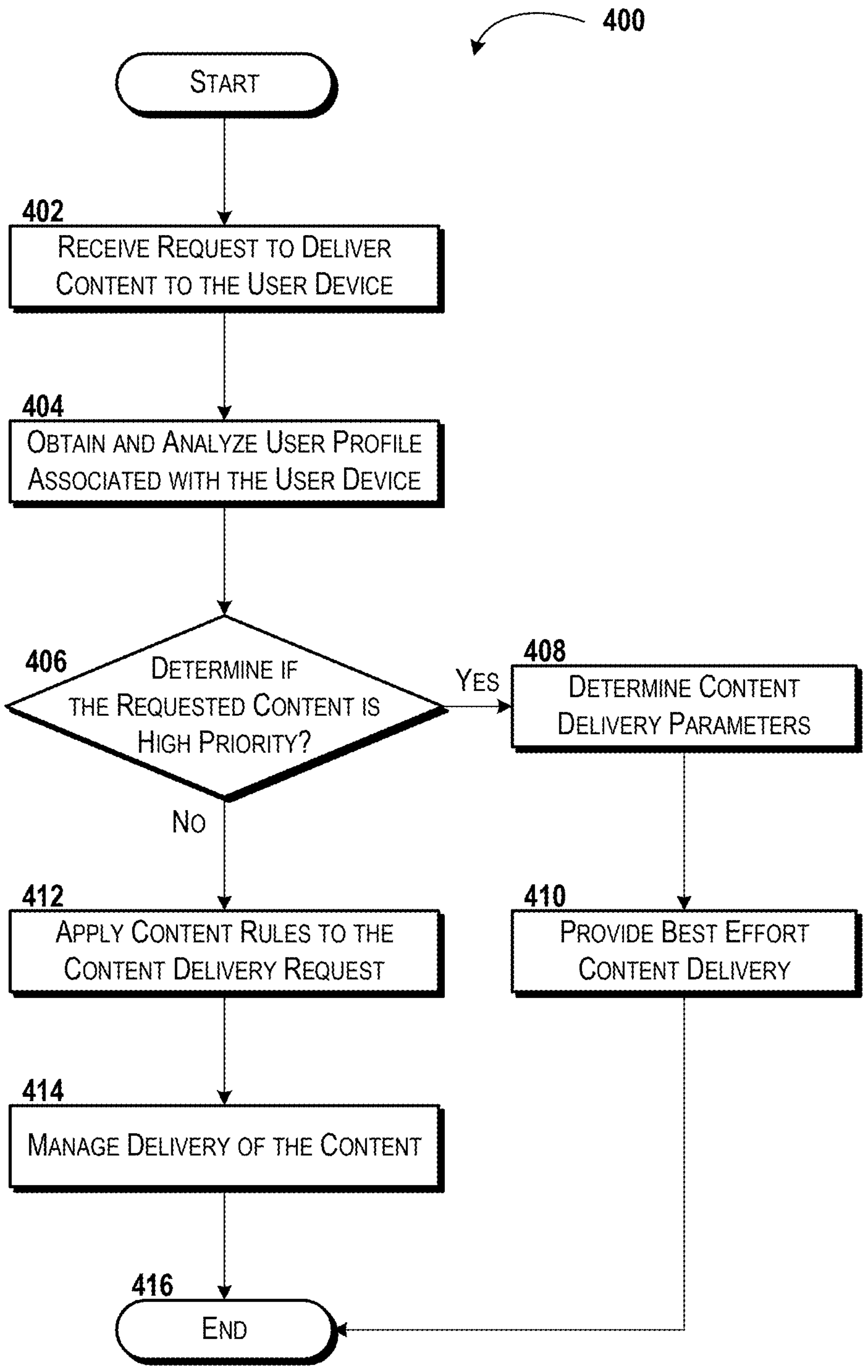
FIG. 4 is a flow diagram showing aspects of a method for managing content delivery during direct-to-cell satellite coverage, according to an illustrative embodiment of the concepts and technologies described herein.

Turning now to FIG. 4, aspects of a method 400 for managing content delivery during direct-to-cell satellite coverage will be described in detail, according to an illustrative embodiment. For purposes of illustrating and describing the concepts of the present disclosure, the method 400 is described herein as being performed by the application server 124 via execution of one or more software modules such as, for example, the content delivery service. It should be understood that additional and/or alternative devices and/or network nodes can provide the functionality described herein via execution of one or more modules, applications, and/or other software including, but not limited to, the content delivery service. Thus, the illustrated embodiments are illustrative, and should not be viewed as being limiting in any way.

The method 400 begins at operation 402. At operation 402, the application server 124 can receive a request to deliver content to the user device 102. According to various embodiments of the concepts and technologies disclosed herein, as illustrated in FIG. 1, the request to deliver content to the user device 102 can correspond to a content request as illustrated in FIG. 1. As such, it can be appreciated that the application server 124 can receive the request to deliver content to the user device 102 in operation 402 from the user device 102 (e.g., as part of the content communications 128 between the application server 124 and the user device 102), from the server computer 116 (e.g., as part of the application communications 130), which may relay the content request received by the server computer 116 as part of the content communications 128 between the server computer 116 and the user device 102, or from other entities and/or devices. Thus, it can be appreciated that operation 402 can correspond to the application server 124 receiving the request to deliver content to the user device 102 directly from the user device 102 or via other devices or entities such as the server computer 116. Because the request to request to deliver content to the user device 102 can be received in additional and/or alternative manners, it should be understood that these example embodiments are illustrative, and therefore should not be construed as being limiting in any way.

From operation 402, the method 400 can proceed to operation 404. At operation 404, the application server 124 can obtain and analyze a user profile 120 that is associated with the user device 102 (that generated the request received in operation 402). Operation 404 can include the application server 124 generating and sending, to the server computer 116, a profile request. The profile request generated by the application server 124 can include, in some embodiments, identity data associated with the user device 102 and/or other identifying information that can be used to identify a user profile 120 associated with the user device 102. Operation 404 also can include the application server 124 receiving, from the server computer 116, a user profile 120 that is responsive to the profile request (e.g., a user profile 120 that is associated with the identifying information provided by the application server 124, or the like). It should be understood that this example embodiment is illustrative, and therefore should not be construed as being limiting in any way.

From operation 404, the method 400 can proceed to operation 406. At operation 406, the application server 124 can determine if the requested content (e.g., the content requested in operation 402) is high priority. Operation 406 can include the application server 124 determining if the content rules of the user profile 120 obtained in operation 404 define the content requested by the user device 102 in operation 402 as high priority such as relating to an emergency, or the like, as defined by the content rules. If the requested content is high priority, the content rules may instruct the application server 124 to deliver the content in its original form, or to modify the content or substitute for the content in cases in which the content would otherwise not be delivered. Thus, the application server 124 may be configured to reduce data transmission resource consumption for the content in cases where the content would otherwise be blocked (were it not for the high priority determination of operation 406). It should be understood that this example embodiment is illustrative, and therefore should not be construed as being limiting in any way.

Thus, operation 406 can include the application server 124 determining, based on the analysis of the user profile 120 in operation 404, if the content rules allow delivery of the content in any format, if the content rules block delivery of the content in its original format, if the content rules allow delivery of the content in its original (e.g., unmodified) format, if the content rules suggest or require any modifications to the content before delivery, or the like.

In particular, in some embodiments of the concepts and technologies disclosed herein, the content rules may indicate that when the user device 102 is connected via (only) a connection supported by a direct-to-cell network 110, that content generated or otherwise provided by the application 126 should be blocked unless the content is defined as high priority, in which case the content is to be modified to consume less data than the unedited and/or unmodified content requested by the user device 102. In some embodiments, these rules can also define one or more exceptions (to the rule that content be modified to consume less data) under certain circumstances. For example, the rules may define exceptions such as, for example, the content relating to an emergency condition associated with the user device 102, that the user device 102 is prioritized, or the like. Thus, operation 406 can include the application server 124 determining if the content should be blocked and, if so, if any exceptions to the content rules (requiring delivery of the content) apply to this particular request received in operation 402, and if so, if the content should be modified. It should be understood that this example embodiment is illustrative, and therefore should not be construed as being limiting in any way.

If the application server 124 determines, in operation 406, that the content requested in operation 402 is defined (e.g., by the content rules of the user profile 120 obtained in operation 404) as high priority, the method 400 can proceed to operation 408. At operation 408, the application server 124 can determine content delivery parameters for the content requested in operation 402. The content delivery parameters can be determined based on the content rules (of the user profile 120) and can define, for high priority content, if the content is to be provided in its original form, modified to consume less data, substituted for in some manner, or the like. In some embodiments, the delivery parameters can include, but are not limited to, reducing resolution of the content, reducing audio sampling rates of the content, cropping the content, trimming (e.g., shortening the duration of video or audio) the content, providing a transcript of the content (e.g., a video transcript), combinations thereof, or the like.

According to various embodiments of the concepts and technologies disclosed herein, the application server 124 can also be configured to determine and/or adjust delivery parameters in operation 408 by communicating with the user device 102. In particular, as illustrated and described herein, the content communications 128 exchanged between the application server 124 and the user device 102 can include notifications (for informing the user device 102 that content may be delayed, blocked, modified, or the like) and content requests (e.g., the original content requests and/or additional content requests (e.g., modified, cancelled, delayed, or the like) from the user device 102 based, for example, on input obtained at a user interface generated at the user device 102). As such, operation 408 can include the application server 124 communicating with the user device 102 to determine if requested content should be provided or if delivery should be cancelled based on limitations that may be imposed on the content delivery (e.g., delays, modifications to the content, or the like), if delivery of the content should be tried again later, if other entities should be updated (e.g., devices trying to contact the user device 102), combinations thereof, or the like. Some example user interfaces for these and other functions associated with the application server 124 and/or the user device 102 are illustrated and described herein with reference to FIGS. 6A-6B. Because other user interfaces can be provided in accordance with the embodiments of the concepts and technologies disclosed herein, it should be understood that these example embodiments are illustrative, and therefore should not be construed as being limiting in any way.

From operation 408, the method 400 can proceed to operation 410. At operation 410, the application server 124 can provide best effort content delivery for the content requested in operation 402. As used herein, "best effort content delivery" and/or variants thereof can refer to attempting to deliver the original content (as requested by the user device 102 or other device) in its original form if possible, meaning that sending the original content to the user device 102 is feasible given current network conditions and the like. If the application server 124 determines that the original content in its original format cannot be delivered in the original format (e.g., if the available bandwidth associated with the direct-to-cell satellite network 110 makes such delivery impossible), then the application server 124 can provide "best effort content delivery" by delivering as much of the content to the user device 102 as possible, with the content being provided by the application server 124 to the user device 102 in a form that is as close to the original as possible.

In some embodiments, "best effort content delivery" can include modifying the content before delivering the content. In particular, the application server 124 can be configured to modify the content by, for example, trimming, cropping, or otherwise selecting only a portion of the content to provide (e.g., trimming a video or audio file to less than the full length, cropping a video to less than the full frame, cropping an image to less than the full image, or the like); reducing resolution of an image or video file; reducing a frame rate of a video file; reducing a sampling rate of an audio file; reducing a number of colors of an image or video; changing a compression and/or decompression algorithm ("codec") that is used to reduce the size of the data of a file; reducing a frequency of updates in a data stream; converting video files to image files (e.g., a representative image taken from the video instead of the video); converting a video call to a voice call; combinations thereof; or the like.

In some embodiments, the application server 124 can determine that a substitute file will be provided instead of the original content (e.g., a particular video of cardiopulmonary resuscitation ("CPR") may be requested by the user device 102 and the application server 124 may identify and provide a different video that has a smaller file size), in some embodiments. Thus, the application server 124 can be configured to identify the content and/or details thereof (e.g., subject matter, a transcript, etc.) and identify suitable substitutions. As such, operation 410 can include determining what content to provide, how to provide the content, when to provide the content, and the like. In some cases, as noted above, the application server 124 can determine that the original content is to be provided to the user device 102 in operation 410 and/or 412, a determination that may not be made in various embodiments if the requested content is not determined to be "high priority." It should be understood that this example embodiment is illustrative, and therefore should not be construed as being limiting in any way.

Returning to operation 406, if the application server 124 determines, in operation 406, that the content requested in operation 402 is not defined (e.g., by the content rules of the user profile 120 obtained in operation 404) as high priority, the method 400 can proceed to operation 412. In operation 412, the application server 124 can apply the content rules to the content delivery request. The content rules can define, for example, a maximum data size (e.g., a file size, size per time unit (e.g., bytes per second), or the like) that can be allowed for the content delivered to the user device 102 when connected to the direct-to-cell satellite connection provided by the direct-to-cell satellite network 110, data and/or content types that will not be delivered (e.g., may be blocked) to the user device 102 when connected to the direct-to-cell satellite connection provided by the direct-to-cell satellite network 110, data and/or content that may be delayed until the user device 102 connects to a network connection other than the direct-to-cell satellite connection provided by the direct-to-cell satellite network 110, and the like. According to various embodiments of the concepts and technologies disclosed herein, delivery of the content may be blocked or delayed by the application server 124 unless determined to be "high priority" as explained above. It should be understood that this example embodiment is illustrative, and therefore should not be construed as being limiting in any way.

In some other embodiments, the application server 124 can be configured to modify the content when the user device 102 is connected to the direct-to-cell satellite connection provided by the direct-to-cell satellite network 110 to enable delivery. Thus, the application server 124 can be configured to modify the content by, for example, by providing a representative image taken from the video instead of a video file; by informing the user device that an incoming video call cannot be completed and instead recommending other types of communications such as text exchanges, audio calls, or the like; by suggesting a follow-up call or communication when the user device 102 connects to a less-limited data connection; combinations thereof; or the like. As such, operation 412 can correspond to the application server 124 applying the content rules to the content requested by the content delivery request to determine how the content may be delivered. It should be understood that this example embodiment is illustrative, and therefore should not be construed as being limiting in any way.

From operation 412, the method 400 can proceed to operation 414. At operation 414, the application server 124 can manage delivery of the content requested in operation 402. It can be appreciated with reference to the above description that the application server 124 can manage the delivery of the content by blocking the delivery of the content. In such cases, the application server 124 can inform the user device 102 about the blocked content and the user device 102 can be configured to generate and present a user interface that communicates the blocking of the content to a user of the user device 102. In some other embodiments, the application server 124 can manage the delivery of the content by delaying delivery of the content with or without options for obtaining the content at another time.

The application server 124 can be configured to inform the user device 102 about the delayed content and the user device 102 can be configured to generate and present a user interface that communicates the delaying of the content to a user of the user device 102 with or without options for obtaining the content. In yet other embodiments, the application server 124 can manage the delivery of the content by delaying a partial representation of the content (e.g., a single image taken from a video file or video call, a thumbnail image of a requested image, or the like) with or without options for obtaining the content at another time. The application server 124 can be configured to inform the user device 102 about the content that is not being delivered in its entirety and the user device 102 can be configured to generate and present a user interface that communicates this to a user of the user device 102 with or without options for obtaining the content. Because managing delivery of the content can be accomplished in additional and/or alternative manners as illustrated and described herein, it should be understood that these example embodiments are illustrative, and therefore should not be construed as being limiting in any way.

From operation 414, the method 400 can proceed to operation 416. The method 400 can also proceed to operation 416 from operation 410. The method 400 can end at operation 416.

Figure 5:
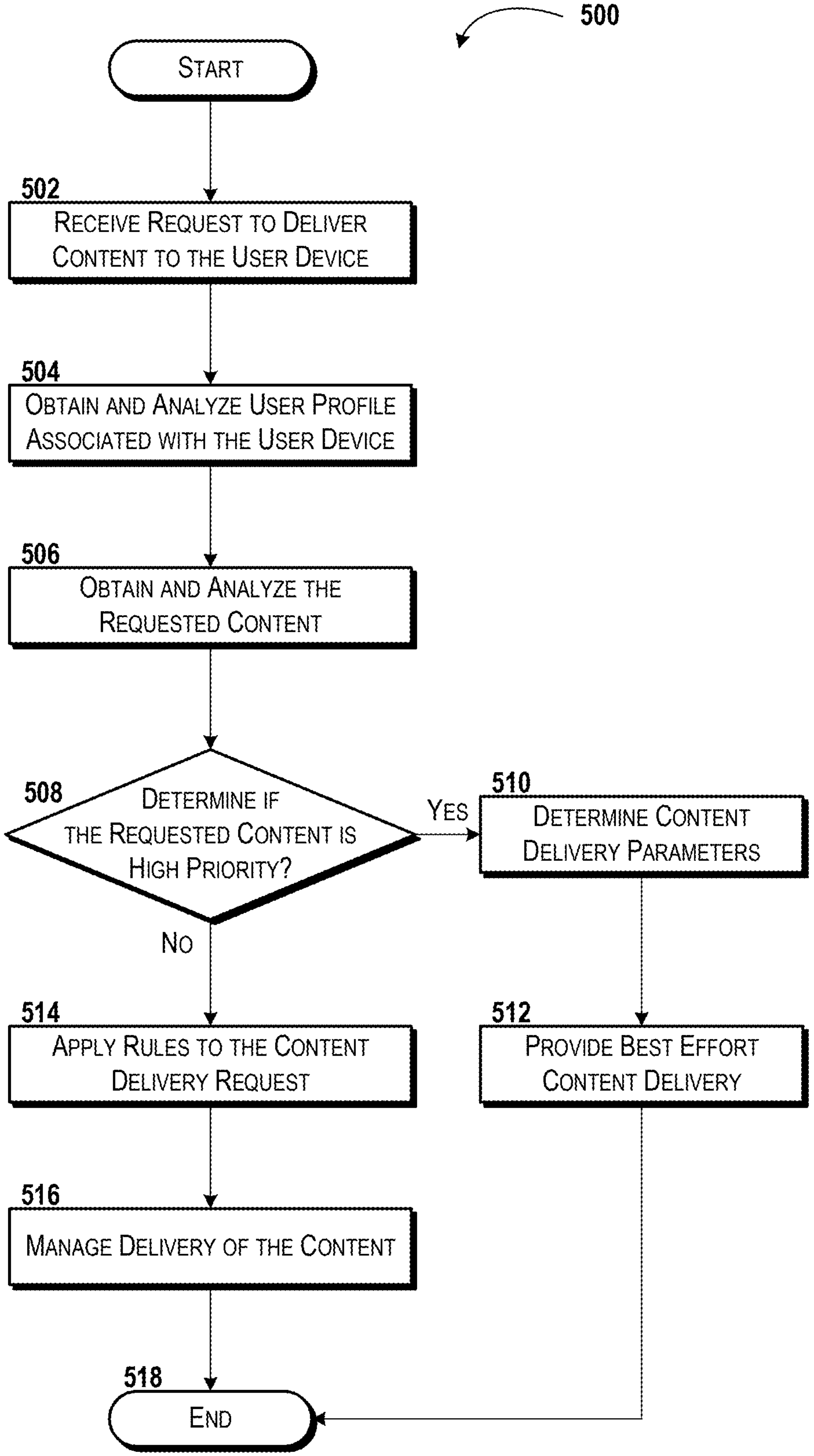
FIG. 5 is a flow diagram showing aspects of a method for managing content delivery during direct-to-cell satellite coverage, according to another illustrative embodiment of the concepts and technologies described herein.

Turning now to FIG. 5, aspects of a method 500 for managing content delivery during direct-to-cell satellite coverage will be described in detail, according to an illustrative embodiment. For purposes of illustrating and describing the concepts of the present disclosure, the method 500 is described herein as being performed by the user device 102 via execution of one or more software modules such as, for example, the coverage management service 114. It should be understood that additional and/or alternative devices and/or network nodes can provide the functionality described herein via execution of one or more modules, applications, and/or other software including, but not limited to, the coverage management service 114. Thus, the illustrated embodiments are illustrative, and should not be viewed as being limiting in any way.

The method 500 begins at operation 502. At operation 502, the server computer 116 can receive a request to deliver content to the user device 102. According to various embodiments of the concepts and technologies disclosed herein, as illustrated in FIG. 1, the request to deliver content to the user device 102 can correspond to a content request as illustrated in FIG. 1. As such, it can be appreciated that the server computer 116 can receive the request to deliver content to the user device 102 in operation 502 from the user device 102 (e.g., as part of the content communications 128 between the server computer 116 and the user device 102) or from other entities and/or devices. Because the request to request to deliver content to the user device 102 can be received in additional and/or alternative manners, it should be understood that these example embodiments are illustrative, and therefore should not be construed as being limiting in any way.

From operation 502, the method 500 can proceed to operation 504. At operation 504, the server computer 116 can obtain and analyze a user profile 120 that is associated with the user device 102 (that generated the request received in operation 502). The server computer 116 can be configured to determine an identity associated with the user device 102 (e.g., based on identity data associated with the user device 102 and/or other identifying information) and use that identity to identify a user profile 120 associated with the user device 102. Thus, although not shown in FIG. 1, it can be appreciated that the content communications 128 can include information that identifies the user device 102 and/or a user thereof. It should be understood that this example embodiment is illustrative, and therefore should not be construed as being limiting in any way.

From operation 504, the method 500 can proceed to operation 506. At operation 506, the server computer 116 can obtain and analyze the requested content. According to some embodiments of the concepts and technologies disclosed herein, the server computer 116 can be configured to communicate, to the application server 124, the content request from the user device 102. The application server 124 can provide the content to the server computer 116 and the server computer 116 can analyze the content in operation 506 to determine what the content is, an amount of data associated with the content, and the like. As explained herein, the coverage management application 108 can include functionality for analyzing video, images, data files, audio, data streams, and/or other application content to identify the content.

In some embodiments, the identity of the content can be used by the server computer 116 to determine if the content is "high priority" as illustrated and described herein and/or for other purposes. Thus, it can be appreciated that the server computer 116 can analyze the content to determine if the content relates to an immediate use (e.g., an emergency condition or the like) at the user device 102 and/or should be prioritized for any other reason. The analysis of operation 506 also can be performed to determine if the size of the content exceeds limits for the direct-to-cell connection provided by the direct-to-cell satellite network 110 and therefore should be blocked, delayed, and/or modified. Because the content can be analyzed for additional and/or alternative reasons, it should be understood that these example embodiments are illustrative, and therefore should not be construed as being limiting in any way.

From operation 506, the method 500 can proceed to operation 508. At operation 508, the server computer 116 can determine if the requested content (e.g., the content requested in operation 502) is high priority. Operation 508 can include the server computer 116 determining if the content rules of the user profile 120 obtained in operation 504 and/or the analysis of the content in operation 506 define the content requested by the user device 102 in operation 502 as high priority such as relating to an emergency, or the like. If the requested content is high priority, the content rules may instruct the server computer 116 to deliver the content in its original form, or to modify the content or substitute for the content in cases in which the content would otherwise not be delivered. Thus, the server computer 116 may be configured to reduce data transmission resource consumption for the content in cases where the content would otherwise be blocked (were it not for the high priority determination in operation 508). It should be understood that this example embodiment is illustrative, and therefore should not be construed as being limiting in any way.

Thus, operation 508 can include the server computer 116 determining, based on the analysis of the user profile 120 in operation 504, if the content rules allow delivery of the content in any format, if the content rules block delivery of the content in its original format, if the content rules allow delivery of the content in its original (e.g., unmodified) format, if the content rules suggest or require any modifications to the content before delivery, or the like. In particular, in some embodiments of the concepts and technologies disclosed herein, the content rules may indicate that when the user device 102 is connected via (only) a connection supported by a direct-to-cell network 110, that content for the user device 102 should be blocked unless the content is defined as high priority, in which case the content is to be modified to consume less data than the unedited and/or unmodified content requested by the user device 102.

In some embodiments, these rules can also define one or more exceptions (to the rule that content be modified to consume less data) under certain circumstances. For example, the rules may define exceptions such as, for example, the content relating to an emergency condition associated with the user device 102, that the user device 102 is prioritized, or the like. Thus, operation 508 can include the server computer 116 determining if the content should be blocked and, if so, if any exceptions to the content rules (requiring delivery of the content) apply to this particular request received in operation 502, and if so, if the content should be modified. It should be understood that this example embodiment is illustrative, and therefore should not be construed as being limiting in any way.

If the server computer 116 determines, in operation 508, that the content requested in operation 502 is defined (e.g., by the content rules of the user profile 120 obtained in operation 504) as high priority, the method 500 can proceed to operation 510. At operation 510, the server computer 116 can determine content delivery parameters for the content requested in operation 502. The content delivery parameters can be determined based on the content rules (of the user profile 120), by settings and/or configurations of the coverage management service 114, and/or other rules. The content delivery parameters can define, for high priority content, if the content is to be provided in its original form, modified to consume less data, substituted for in some manner, and/or a collection of these and/or other options and an order of preference, if applicable, or the like. In some embodiments, the delivery parameters can include, but are not limited to, reducing resolution of the content, reducing audio sampling rates of the content, cropping the content, trimming (e.g., shortening the duration of video or audio) the content, providing a transcript of the content (e.g., a video transcript), combinations thereof, or the like. Other changes to the content are possible and are contemplated, so the above examples are illustrative and should not be construed as being limiting in any way.

According to various embodiments of the concepts and technologies disclosed herein, the server computer 116 can also be configured to determine and/or adjust delivery parameters in operation 510 by communicating with the user device 102. In particular, as illustrated and described herein, the content communications 128 exchanged between the server computer 116 and the user device 102 can include notifications (for informing the user device 102 that content may be delayed, blocked, modified, or the like) and content requests (e.g., the original content requests and/or additional content requests (e.g., modified, cancelled, delayed, or the like) from the user device 102 based, for example, on input obtained at a user interface generated at the user device 102). As such, operation 510 can include the server computer 116 communicating with the user device 102 to determine if requested content should be provided or if delivery should be cancelled based on limitations that may be imposed on the content delivery (e.g., delays, modifications to the content, or the like), if delivery of the content should be tried again later, if other entities should be updated (e.g., devices trying to contact the user device 102), combinations thereof, or the like. Some example user interfaces for these and other functions associated with the server computer 116 and/or the user device 102 are illustrated and described herein with reference to FIGS. 6A-6B. Because other user interfaces can be provided in accordance with the embodiments of the concepts and technologies disclosed herein, it should be understood that these example embodiments are illustrative, and therefore should not be construed as being limiting in any way.

From operation 510, the method 500 can proceed to operation 512. At operation 512, the server computer 116 can provide best effort content delivery for the content requested in operation 502. As used herein, "best effort content delivery" and/or variants thereof can refer to attempting to deliver the original content (as requested by the user device 102 or other device) in its original form if possible, meaning that sending the original content to the user device 102 is feasible given current network conditions and the like. If the server computer 116 determines that the original content in its original format cannot be delivered in the original format (e.g., if the available bandwidth associated with the direct-to-cell satellite network 110 makes such delivery impossible), then the server computer 116 can provide "best effort content delivery" by delivering as much of the content to the user device 102 as possible, with the content being provided by the server computer 116 to the user device 102 in a form that is as close to the original as possible.

In some embodiments, "best effort content delivery" can include modifying the content before delivering the content. In particular, the server computer 116 can be configured to modify the content by, for example, trimming, cropping, or otherwise selecting only a portion of the content to provide (e.g., trimming a video or audio file to less than the full length, cropping a video to less than the full frame, cropping an image to less than the full image, or the like); reducing resolution of an image or video file; reducing a frame rate of a video file; reducing a sampling rate of an audio file; reducing a number of colors of an image or video; changing a compression and/or decompression algorithm ("codec") that is used to reduce the size of the data of a file; reducing a frequency of updates in a data stream; converting video files to image files (e.g., a representative image taken from the video instead of the video); converting a video call to a voice call; combinations thereof; or the like.

In some embodiments, the server computer 116 can determine that a substitute file will be provided instead of the original content (e.g., a particular video of cardiopulmonary resuscitation ("CPR") may be requested by the user device 102 and the server computer 116 may identify and provide a different video that has a smaller file size), in some embodiments. Thus, the server computer 116 can be configured to identify the content and/or details thereof (e.g., subject matter, a transcript, etc.) and identify suitable substitutions. As such, operation 512 can include determining what content to provide, how to provide the content, when to provide the content, and the like. In some cases, as noted above, the server computer 116 can determine that the original content is to be provided to the user device 102 in operation 512 and/or 514, a determination that may not be made in various embodiments if the requested content is not determined to be "high priority." It should be understood that this example embodiment is illustrative, and therefore should not be construed as being limiting in any way.

Returning to operation 508, if the server computer 116 determines, in operation 508, that the content requested in operation 502 is not defined (e.g., by the content rules of the user profile 120 obtained in operation 504) as high priority, the method 500 can proceed to operation 514. In operation 514, the server computer 116 can apply the content rules to the content delivery request. The content rules can define, for example, a maximum data size (e.g., a file size, size per time unit (e.g., bytes per second), or the like) that can be allowed for the content delivered to the user device 102 when connected to the direct-to-cell satellite connection provided by the direct-to-cell satellite network 110, data and/or content types that will not be delivered (e.g., may be blocked) to the user device 102 when connected to the direct-to-cell satellite connection provided by the direct-to-cell satellite network 110, data and/or content that may be delayed until the user device 102 connects to a network connection other than the direct-to-cell satellite connection provided by the direct-to-cell satellite network 110, and the like. According to various embodiments of the concepts and technologies disclosed herein, delivery of the content may be blocked or delayed by the server computer 116 unless determined to be "high priority" as explained above. It should be understood that this example embodiment is illustrative, and therefore should not be construed as being limiting in any way.

In some other embodiments, the server computer 116 can be configured to modify the content when the user device 102 is connected to the direct-to-cell satellite connection provided by the direct-to-cell satellite network 110 to enable delivery. Thus, the server computer 116 can be configured to modify the content by, for example, to provide a representative image taken from the video instead of a video file; to inform the user device that an incoming video call cannot be completed and instead recommending other types of communications such as text exchanges, audio calls, or the like; by suggesting a follow-up call or communication when the user device 102 connects to a less-limited data connection; combinations thereof; or the like. As such, operation 514 can correspond to the server computer 116 applying the content rules to the content requested by the content delivery request to determine how the content may be delivered. It should be understood that this example embodiment is illustrative, and therefore should not be construed as being limiting in any way.

From operation 514, the method 500 can proceed to operation 516. At operation 516, the server computer 116 can manage delivery of the content requested in operation 502. It can be appreciated with reference to the above description that the server computer 116 can manage the delivery of the content by blocking the delivery of the content. In such cases, the server computer 116 can inform the user device 102 about the blocked content and the user device 102 can be configured to generate and present a user interface that communicates the blocking of the content to a user of the user device 102. In some other embodiments, the server computer 116 can manage the delivery of the content by delaying delivery of the content with or without options for obtaining the content at another time.

The server computer 116 can be configured to inform the user device 102 about the delayed content and the user device 102 can be configured to generate and present a user interface that communicates the delaying of the content to a user of the user device 102 with or without options for obtaining the content. In yet other embodiments, the server computer 116 can manage the delivery of the content by delaying a partial representation of the content (e.g., a single image taken from a video file or video call, a thumbnail image of a requested image, or the like) with or without options for obtaining the content at another time. The server computer 116 can be configured to inform the user device 102 about the content that is not being delivered in its entirety and the user device 102 can be configured to generate and present a user interface that communicates this to a user of the user device 102 with or without options for obtaining the content. Because managing delivery of the content can be accomplished in additional and/or alternative manners as illustrated and described herein, it should be understood that these example embodiments are illustrative, and therefore should not be construed as being limiting in any way.

From operation 516, the method 500 can proceed to operation 518. The method 500 can also proceed to operation 518 from operation 512. The method 500 can end at operation 518.

Figure 6A:
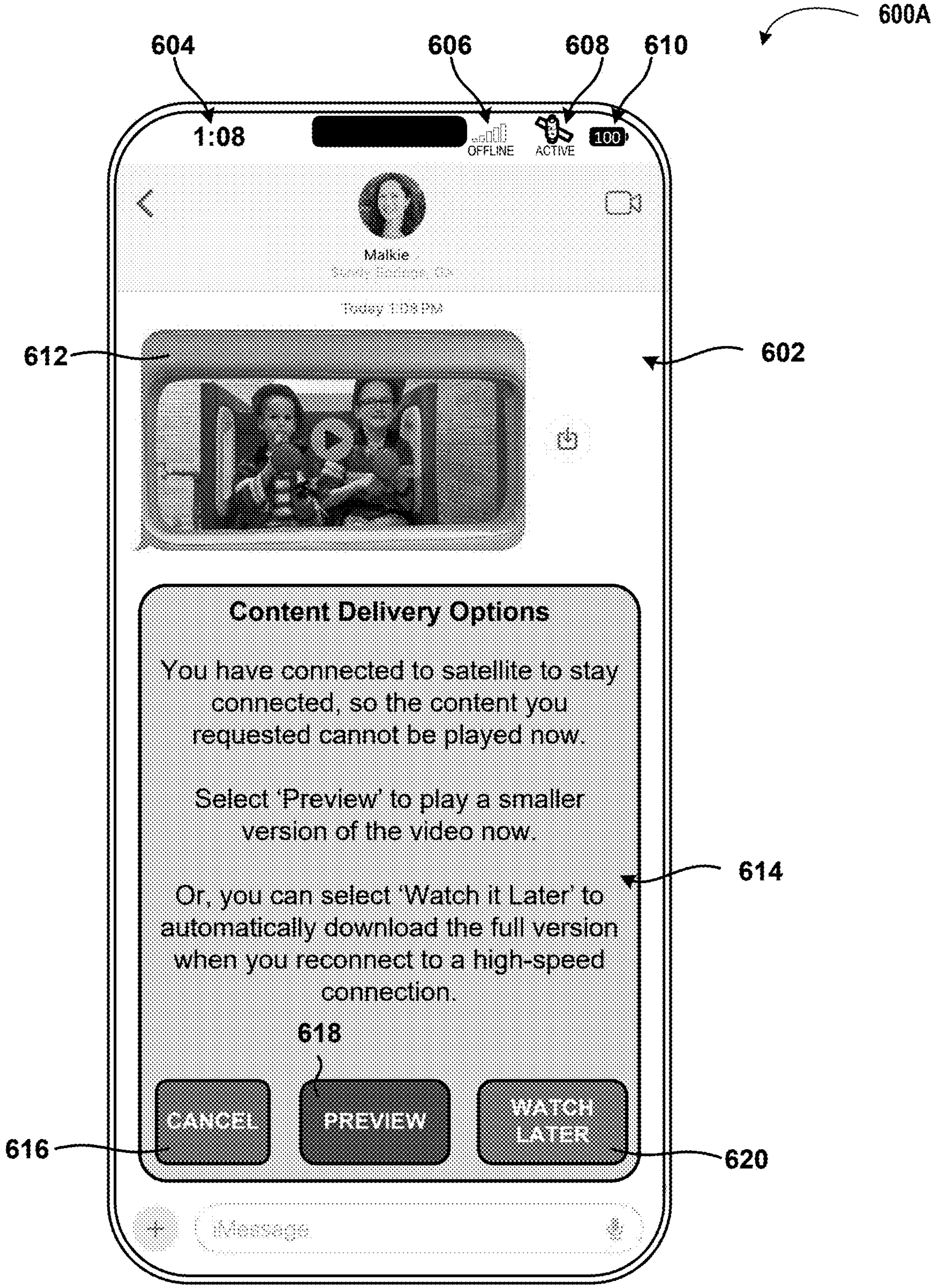
FIGS. 6A-6B are user interface diagrams showing various screen displays for providing application-level content control for direct-to-cell satellite coverage, according to some illustrative embodiments of the concepts and technologies described herein.
Figure 6B:
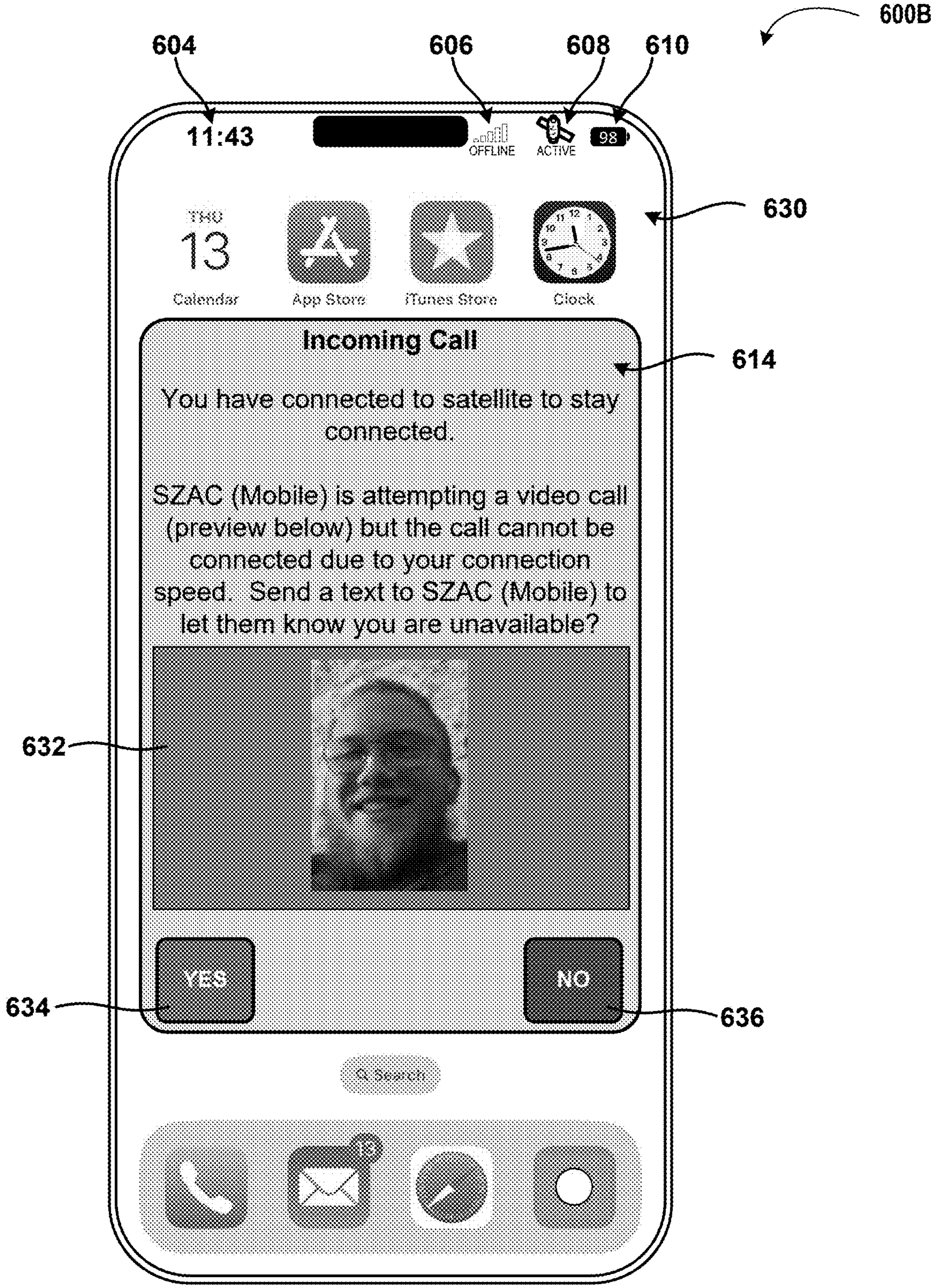

FIGS. 6A-6B are user interface ("UI") diagrams showing aspects of UIs for using and/or interacting with the coverage management application 108, the coverage management service 114, and/or the application 126 hosted by the application server 124, according to some illustrative embodiments. FIG. 6A shows an illustrative screen display 600A. According to some embodiments of the concepts and technologies described herein, the screen display 600A can be generated by a device such as the user device 102 via interactions with the coverage management application 108, the coverage management service 114, the application server 124, and/or the like. It should be appreciated that the UI diagram illustrated in FIG. 6A is illustrative of one contemplated example of the UIs that can be generated and/or displayed in accordance with the concepts and technologies disclosed herein, and therefore should not be construed as being limiting in any way.

According to various embodiments, the screen display 600A can be presented, for example, when the user device 102 has requested content provided by the application 126 hosted and/or executed by the application server 124, but the content has been delayed, blocked, and/or modified (e.g., by the coverage management service 114 and/or the application 126) due to the user device 102 being connected a limited-connectivity network connection associated with a direct-to-cell satellite network 110. It can be appreciated with reference to the embodiments of the concepts and technologies disclosed herein that the user device 102 may determine that the user device 102 has connected to the limited connectivity connection based on detecting the active network connections locally, based on notifications included in the content communications 128 with the server computer 116 and/or the application server 124, and/or based on other information obtained from other devices, entities, or resources. It should be understood that this example embodiment is illustrative, and therefore should not be construed as being limiting in any way.

In the example screen display 600A shown in FIG. 6A, the user device 102 is illustrated as displaying a messaging screen 602. It should be understood that this example embodiment is illustrative, and therefore should not be construed as being limiting in any way. Because one or more elements of the screen display 600A illustrated in FIG. 6A can be displayed at additional and/or alternative times (e.g., when the user device 102 is locked), and because one or more elements of the screen display 600A may or may not be included in all embodiments, it should be understood that the illustrated example embodiment is illustrative and therefore should not be construed as being limiting in any way.

As is generally understood, the messaging screen 602 can be configured to present some information and/or options to a user while the user device 102 is, for example, being used to send messages, review received messages, and the like. For example, as is known and as is illustrated in FIG. 6A, the messaging screen 602 can include various types of data and/or information such as time and/or date information 604, which can display a current time and/or date; carrier information (not illustrated in FIG. 6A), which can be included to indicate a carrier associated with a primary network connection and/or network to which the user device 102 is connected at the time; signal strength information 606 for the primary network connection, which can indicate a strength of a signal associated with the primary network to which the user device 102 is connected at the time; a WiFi signal indicator (not shown), which can indicate in some instances that a WiFi connection is available, active, and optionally an associated signal strength of the WiFi signal; a direct-to-cell satellite connection indicator 608, which optionally can include an associated signal strength indicator (not shown); battery charge information 610; other information; combinations thereof; or the like.

As shown in FIG. 6A, a status of one or more networks can be displayed on the messaging screen 602 and/or elsewhere. In the illustrated embodiment, a status of "offline" is displayed under the signal strength information 606, thereby indicating that the primary network connection such as a cellular network connection to a terrestrial cellular network is not active at the current time; and a status of "active" is displayed under the direct-to-cell satellite connection indicator 608, thereby indicating that a direct-to-cell satellite connection is active and/or connected at the current time and is functioning as the only network connection for the user device 102. It should be understood that this example embodiment is illustrative, and therefore should not be construed as being limiting in any way.

According to various embodiments of the concepts and technologies disclosed herein, the messaging screen 602 can include a video representation 612. The video representation 612 can correspond to thumbnail or other representation of a video file that has been requested by the user device 102, attempted to be sent to the user device 102 by others, or the like. In the illustrated embodiment, a video file represented by the video representation 612 has been sent to the user device 102 but has not yet been delivered as will be illustrated and described herein. It should be understood that this example embodiment is illustrative, and therefore should not be construed as being limiting in any way.

The messaging screen 602 also can include an application-level content control window 614. The application-level content control window 614 can be provided in various conditions illustrated and described herein to provide information about content, to obtain input from a user, to enable and/or disable options for obtaining content, combinations thereof, or the like. In the embodiment shown in FIG. 6A, the application-level content control window 614 is illustrated as indicating that the user device 102 has connected to a limited connectivity direct-to-cell satellite connection, that received content cannot be obtained at a current time, and asking the user if the content should be blocked, modified, delayed, or the like. It should be understood that this example embodiment is illustrative, and therefore should not be construed as being limiting in any way.

The application-level content control window 614 can include a UI control 616 for selecting a "cancel" option, a UI control 618 for selecting a "preview" option, and a UI control 620 for selecting a "watch later" option. In the embodiment shown in FIG. 6A, selection of the UI control 616 can cause the user device 102 to cancel delivery of the requested content (e.g., the video associated with the video representation 612 shown in FIG. 6A). Thus, it can be appreciated that selection of the UI control 616 can cause the user device 102 to cancel the attempted retrieval and/or downloading of the content associated with the video representation 612 shown in FIG. 6A. It can be appreciated that content associated with other types of applications may be cancelled in similar manners such as, for example, audio file downloads, image downloads, application data downloads, data stream accesses, and the like. Furthermore, selection of the UI control 616 can cause the user device 102 to inform the coverage management service 114 (or the server computer 116 that hosts and/or executes the coverage management service 114) or the application 126 (or the application server 124 that hosts and/or executes the application 126) to stop delivery of the content. It should be understood that this example embodiment is illustrative, and therefore should not be construed as being limiting in any way.

In the illustrated embodiment, selection of the UI control 618 can cause the user device 102 to indicate to the coverage management service 114 (or the server computer 116 that hosts and/or executes the coverage management service 114) or the application 126 (or the application server 124 that hosts and/or executes the application 126) that the content should be modified from its original format. It can be appreciated that in some embodiments, the UI control 618 may not be included in the application-level content control window 614 as an option to deliver the modified content may not be provided in all cases. It should be understood that this example embodiment is illustrative, and therefore should not be construed as being limiting in any way.

The application-level content control window 614 can also include a UI control 620 for delaying delivery of the content and/or allowing the user device 102 to access the requested content later, for example at a time at which the user device 102 has connected to a network connection other than (or in addition to) the limited-connectivity network connection associated with a direct-to-cell satellite network 110. Selection of the UI control 620 can cause the user device 102 to delay the download of the content (e.g., for a period of time, until a new network connection is detected, and/or other times) as well as to indicate to the coverage management service 114 (or the server computer 116 that hosts and/or executes the coverage management service 114) or the application 126 (or the application server 124 that hosts and/or executes the application 126) that delivery of the content should be delayed. Because the illustrated embodiment of the screen display 600A is illustrative, and because the screen display 600A can include additional and/or alternative information, it should be understood that the embodiment of FIG. 6A is illustrative, and therefore should not be construed as being limiting in any way.

Although FIG. 6A has illustrated an example embodiment in which a video file has been sent to the user device 102, it should be understood that embodiments of the concepts and technologies disclosed herein can also be used to manage delivery of content requested by the user device 102 (e.g., instead of receiving a video in a messaging application, the user device 102 may request access to a video (e.g., at a video service), request audio, request images, request a data stream and/or data file, or the like). As such, it should be understood that this example embodiment is illustrative, and therefore should not be construed as being limiting in any way.

FIG. 6B shows an illustrative screen display 600B. According to some embodiments of the concepts and technologies described herein, the screen display 600B can be generated by a device such as the user device 102 via interactions with the coverage management application 108, the coverage management service 114, and/or the application 126 (executed at the application server 124). It should be appreciated that the UI diagram illustrated in FIG. 6B is illustrative of one contemplated example of the UIs that can be generated and/or displayed in accordance with the concepts and technologies disclosed herein, and therefore should not be construed as being limiting in any way.

According to various embodiments, the screen display 600B can be presented, for example, when the user device 102 has received an incoming video call, but the user device 102 has connected to a limited-connectivity network connection associated with a direct-to-cell satellite network 110 at some point in time before the incoming video call is received (or detected). In the example screen display 600B shown in FIG. 6B, the user device 102 is illustrated as displaying a home screen 630. Because one or more elements of the screen display 600B illustrated in FIG. 6B can be displayed at additional and/or alternative times (e.g., when the user device 102 is locked), and because one or more elements of the screen display 600B may or may not be included in all embodiments, it should be understood that the illustrated example embodiment is illustrative and therefore should not be construed as being limiting in any way.

As is illustrated in FIG. 6B, the home screen 630 can include time and/or date information 604; carrier information (not illustrated in FIG. 6B); signal strength information 606 for the primary network connection, which can indicate a strength of a signal associated with the primary network to which the user device 102 is connected at the time; a WiFi signal indicator (not shown); the direct-to-cell satellite connection indicator 608; battery charge information 610; one or more application icons (not numbered in FIG. 6B); other information, combinations thereof; or the like. As shown in FIG. 6B, a status of"offline" is displayed under the signal strength information 606, thereby indicating that a primary network connection for the user device 102, for example a cellular network connection to a terrestrial cellular network, is inactive at the current time and a status of "active" is displayed under the direct-to-cell satellite connection indicator 608, thereby indicating that a direct-to-cell satellite connection is active and/or connected at the current time, thereby providing the user device 102 with a limited-connectivity network connection. It should be understood that this example embodiment is illustrative, and therefore should not be construed as being limiting in any way.

According to various embodiments of the concepts and technologies disclosed herein, the screen display 600B includes another embodiment of the application-level content control window 614. In the embodiment shown in FIG. 6B, the application-level content control window 614 is illustrated as indicating that the user device 102 has connected to a limited connectivity direct-to-cell satellite connection and has received an incoming video call (i.e., the application server 124 has detected a request to initiate a video call with the user device 102). In this example embodiment, the application server 124 or the server computer 116 has determined that the video call cannot currently be connected due to the limited connectivity of the direct-to-cell satellite connection. As such, the application server 124 (or the server computer 116) has sent a notification to the user device 102 to inform the user device 102 about the incoming video call. Based on this notification, the coverage management application 108 at the user device 102 has created and presented the user interface shown in FIG. 6B (e.g., the screen display 600B) to provide an update at the user device 102. It should be understood that this example embodiment is illustrative, and therefore should not be construed as being limiting in any way.

As shown in FIG. 6B, the application-level content control window 614 can include an explanation that the user device 102 has connected to a limited-connectivity direct-to-satellite network connection and that an incoming video call has been detected (but cannot be provided at a current time due to the connection speed associated with the direct-to-satellite network connection). The application-level content control window 614 also includes a content representation 632, which can provide a preview or thumbnail that represents content that is not being delivered to the user device 102 at the time. In the illustrated embodiment, the content representation 632 includes a small and/or low-resolution image taken from a video stream associated with the incoming video call. It should be understood that this example embodiment is illustrative, and therefore should not be construed as being limiting in any way. As shown in FIG. 6B, the application-level content control window 614 can also include a prompt at the user device 102 to determine if a notification or response should be sent to the device calling the user device 102 (e.g., in a format that can be supported by the limited-connectivity direct-to-satellite network connection such as text or the like). It should be understood that this example embodiment is illustrative, and therefore should not be construed as being limiting in any way.

The application-level content control window 614 can also include a UI control 634 for entering a "yes" option and a UI control 636 for entering a "no" option. In the embodiment shown in FIG. 6B, selection of the UI control 634 can cause the user device 102 to indicate to the coverage management service 114 (hosted and/or executed by the server computer 116) or the application 126 (hosted and/or executed by the application server 124) that a text message should be sent to the device calling the user device 102 to inform the device calling the user device 102 that the user device 102 is currently unavailable. It should be understood that this example embodiment is illustrative, and therefore should not be construed as being limiting in any way. It can be appreciated that when the user device 102 connects to another network connection other than and/or in addition to the limited connectivity direct-to-cell satellite connection to which the user device 102 is currently connected, the coverage management application 108 can provide another update (e.g., an updated application-level content control window 614 or the like). Thus, selection of the UI control 634 can cause the user device 102 to indicate to the coverage management service 114 (hosted and/or executed by the server computer 116) or the application 126 (hosted and/or executed by the application server 124) that content associated with the video call should not be sent to the user device 102, and that a text message should be sent to the device calling the user device 102. Similarly, selection of the UI control 636 can cause the user device 102 to indicate to the coverage management service 114 (hosted and/or executed by the server computer 116) or the application 126 (hosted and/or executed by the application server 124) that content associated with the video call should not be sent to the user device 102, and that a text message should be sent to the device calling the user device 102. It should be understood that this example embodiment is illustrative, and therefore should not be construed as being limiting in any way.

In some embodiments, other options can be provided such as, for example, establishing a video call with the device that attempted to call the user device 102, for example, when the user device 102 connects to another network connection other than and/or in addition to the limited connectivity direct-to-cell satellite connection to which the user device 102 is currently connected. Because the illustrated embodiment of the screen display 600B is illustrative, and because the screen display 600B can include additional and/or alternative information, it should be understood that the embodiment of FIG. 6B is illustrative, and therefore should not be construed as being limiting in any way.

Figure 7:
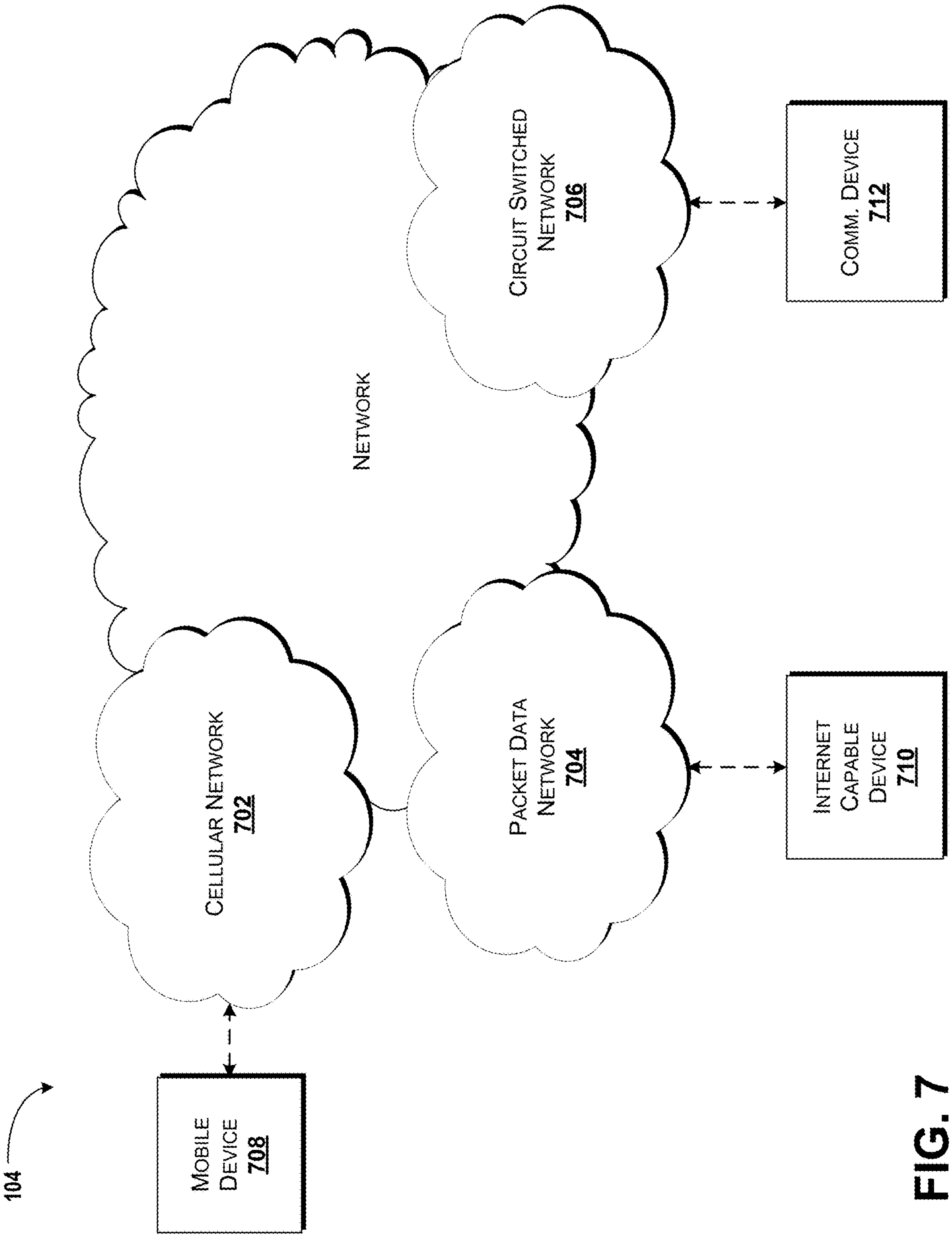
FIG. 7 schematically illustrates a network, according to an illustrative embodiment of the concepts and technologies described herein.

Turning now to FIG. 7, additional details of the network 104 are illustrated, according to an illustrative embodiment. The network 104 includes a cellular network 702, a packet data network 704, for example, the Internet, and a circuit switched network 706, for example, a publicly switched telephone network ("PSTN"). The cellular network 702 includes various components such as, but not limited to, base transceiver stations ("BTSs"), NodeB's or eNodeB's ("eNBs"), gNodeBs ("gNBs"), or the like; base station controllers ("BSCs") radio network controllers ("RNCs"), or the like; an evolved packet core ("EPC"); mobile switching centers ("MSCs" or "MSSs"); session management functions ("SMFs); mobile management entities ("MMEs"); access and mobility management functions ("AMFs); authentication server functions ("AUSFs"), network slice selection functions ("NSSFs); network exposure functions ("NEFs"); policy control functions ("PCFs"); and various other functions in the user and control planes such as, for example, user plane functions ("UPFs), application functions ("AFs"), NF repository functions ("NRFs"), and the like; short message service centers ("SMSCs"); multimedia messaging service centers ("MMSCs"); home location registers ("HLRs"); home subscriber servers ("HSSs"); visitor location registers ("VLRs"); charging platforms; billing platforms; voicemail platforms; GPRS core network components; links to data networks ("DNs") and/or other operator services, third party services, and/or the Internet; location service nodes, an IP Multimedia Subsystem ("IMS"); and the like. Of course, the cellular network 702 also can include various interfaces between various components, as is generally understood. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards, 5G mobile communications standards, 6G mobile communication standards, other mobile communications standards, and evolved and future mobile communications standards. Moreover, the cellular network 702 may facilitate communications over various channel access methods (which may or may not be used by the aforementioned standards) including, but not limited to, TDMA, FDMA, W-CDMA, OFDM, SDMA, and the like. In addition, the cellular network 702 may facilitate data communications using GPRS, EDGE, the HSPA protocol family including HSDPA, EUL or otherwise termed HSUPA, HSPA+, and various other current and future wireless data access standards. Because additional and/or alternative mobile communications standards may be used in accordance with various embodiments of the concepts and technologies disclosed herein, it should be understood that these example embodiments are illustrative, and therefore should not be construed as being limiting in any way.

The packet data network 704 includes various devices, for example, servers, computers, databases, and other devices in communication with one another, as is generally known. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a plain old telephone system (POTS). The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network 104 is used to refer broadly to any combination of the networks 702, 704, 706. It should be appreciated that substantially all of the functionality described with reference to the network 104 can be performed by the cellular network 702, the packet data network 704, and/or the circuit switched network 706, alone or in combination with other networks, network elements, and the like.

As explained herein, the network 104 also can include and/or can access a direct-to-cell satellite network (not visible in FIG. 7). As is generally understood, a direct-to-cell satellite network can include one or more satellites (or constellations of satellites), which can be configured to communicate directly with a mobile device such as the user device 102 illustrated and described herein, which as explained herein can include and/or can be similar to the mobile communications device 708 shown in FIG. 7, a vehicle computing system (e.g., a communications device of a connected car system), and/or other devices that can use the direct-to-cell satellite network to bypass terrestrial wireless networks such as the cellular network 702 and/or some components thereof. The satellites of a direct-to-cell satellite network may be located in low earth orbit and therefore the coverage areas CAs of satellites of direct-to-cell satellite networks may move relative to the surface of the earth over time. Embodiments of the concepts and technologies disclosed herein can include connectivity to these and other networks as illustrated and described herein.

Figure 8:
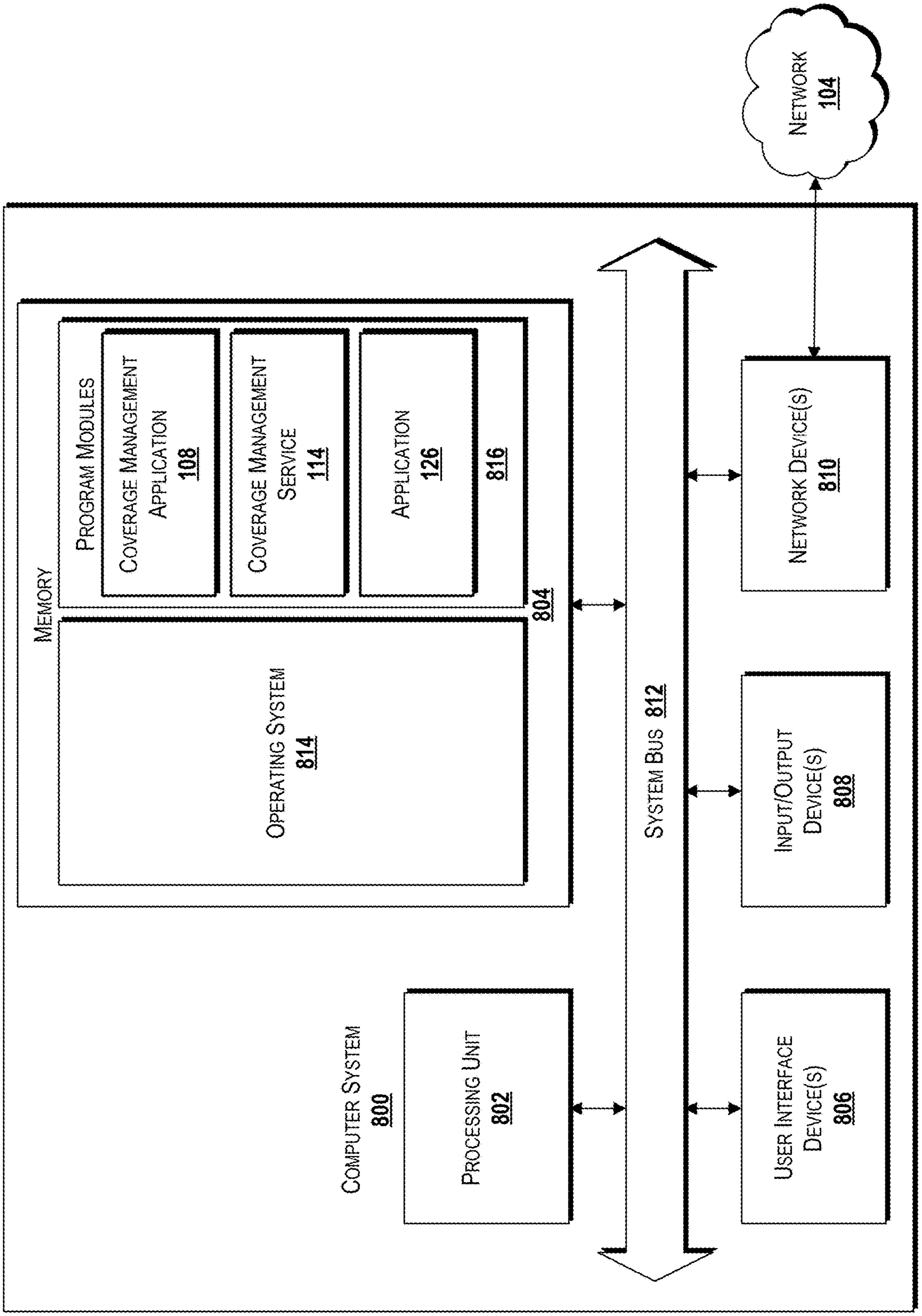
FIG. 8 is a block diagram illustrating an example computer system configured to generate and provide application-level content control for direct-to-cell satellite coverage, according to some illustrative embodiments of the concepts and technologies described herein.

FIG. 8 is a block diagram illustrating a computer system 800 configured to provide the functionality described herein for providing application-level content control for direct-to-cell satellite coverage, in accordance with various embodiments of the concepts and technologies disclosed herein. Thus, the computer system 800 can provide, in some embodiments, one or more functions illustrated and described herein with regard to the user device 102, the server computer 116, the data store 122, and/or the application server 124. The computer system 800 includes a processing unit 802, a memory 804, one or more user interface devices 806, one or more input/output ("I/O") devices 808, and one or more network devices 810, each of which is operatively connected to a system bus 812. The system bus 812 can enable bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or SONOMA families of operating systems from APPLE CORPORATION, the FREEBSD family of operating systems, the SOLARIS family of operating systems from ORACLE CORPORATION, other operating systems, and the like.

The program modules 816 may include various software and/or program modules described herein. In some embodiments, for example, the program modules 816 can include the coverage management application 108, the coverage management service 114, and/or the application 126. These and/or other programs can be embodied in computer-readable media containing instructions that, when executed by the processing unit 802, perform one or more of the methods 200, 300, 400, and 500 described in detail above with respect to FIGS. 2-5 and/or other functionality as illustrated and described herein. It can be appreciated that, at least by virtue of the instructions embodying the methods 200, 300, 400, 500, and/or other functionality illustrated and described herein being stored in the memory 804 and/or accessed and/or executed by the processing unit 802, the computer system 800 is a special-purpose computing system that can facilitate providing the functionality illustrated and described herein. According to embodiments, the program modules 816 may be embodied in hardware, software, firmware, or any combination thereof. Although not shown in FIG. 8, it should be understood that the memory 804 also can be configured to store the device data 118, the user profiles 120, the content communications 128, the application communications 130, and/or other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network, such as the network 104. Examples of the network devices 810 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 9:
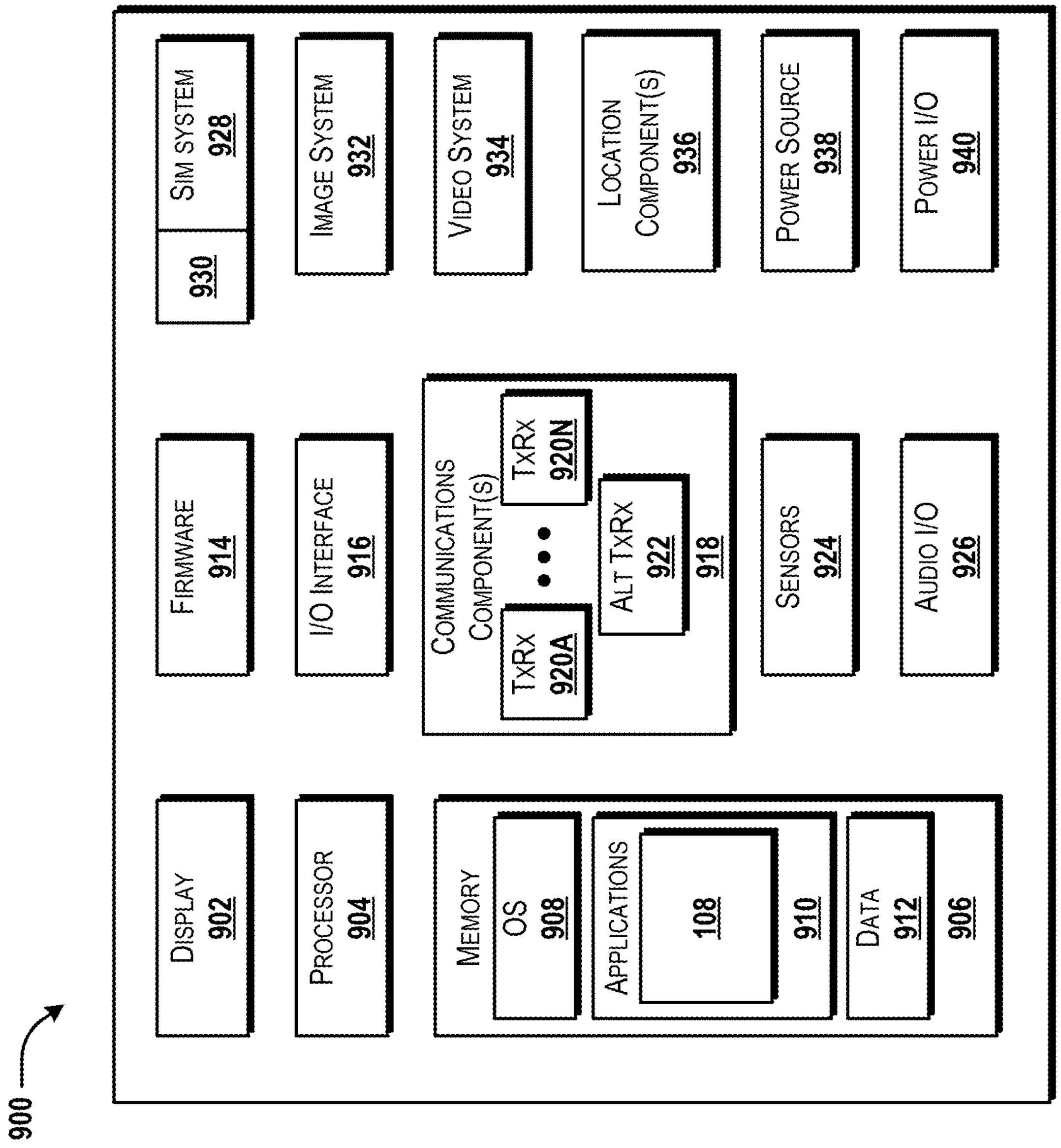
FIG. 9 is a block diagram illustrating an example mobile device configured to interact with a coverage management service, according to some illustrative embodiments of the concepts and technologies described herein.

Turning now to FIG. 9, an illustrative mobile device 900 and components thereof will be described. In some embodiments, the user device 102 described above with reference to FIGS. 1-6B can be configured as and/or can have an architecture similar or identical to the mobile device 900 described herein in FIG. 9. It should be understood, however, that the user device 102 may or may not include the functionality described herein with reference to FIG. 9. While connections are not shown between the various components illustrated in FIG. 9, it should be understood that some, none, or all of the components illustrated in FIG. 9 can be configured to interact with one another to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display various graphical user interface ("GUI") elements such as, for example, elements for indicating one or more active or available network connections, time until a network connection will be available, costs for using a network connection, limitations of a network connection, a status of network connection (e.g., active, inactive, available, unavailable, primary, secondary, etc.), text, images, video, virtual keypads and/or keyboards, messaging data, notification messages, metadata, internet content, device status, time, date, calendar data, device preferences, map and location data, combinations thereof, and/or the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910 such as the coverage management application 108, the coverage management service 114, the application 126, other computer-executable instructions stored in a memory 906, or the like. In some embodiments, the applications 910 also can include a UI application (not illustrated in FIG. 9).

The UI application can interface with the operating system 908, such as the operating system 106 shown in FIG. 1, to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in entering content, providing network connection status and details, configuring settings, manipulating address book content and/or settings, multimode interaction, interacting with other applications 910, and otherwise facilitating user interaction with the operating system 908, the applications 910, and/or other types or instances of data 912 that can be stored at the mobile device 900. The data 912 can include, for example, the coverage management application 108, the coverage management service 114, the application 126, and/or other applications or program modules. According to various embodiments, the data 912 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 910, the data 912, and/or portions thereof can be stored in the memory 906 and/or in a firmware 914, and can be executed by the processor 904.

It can be appreciated that, at least by virtue of storage of the instructions corresponding to the applications 910 and/or other instructions embodying other functionality illustrated and described herein in the memory 906, and/or by virtue of the instructions corresponding to the applications 910 and/or other instructions embodying other functionality illustrated and described herein being accessed and/or executed by the processor 904, the mobile device 900 is a special-purpose mobile device that can facilitate providing the functionality illustrated and described herein. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, history information, location information, contact information, identity data, special contacts, preferences, the device data 118, the user profiles 120, the content communications 128, the application communications 130, user information, organization information, presence status information, user IDs, passwords, and application initiation (start-up) requests. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks such as the network 104, the direct-to-cell satellite network 110, and/or the wireless network 112 described herein. In some embodiments, other networks include networks that utilize non-cellular wireless technologies such as WI-FI or WIMAX. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments one or more of the transceivers of the communications component 918 may be configured to communicate using GSM, CDMAONE, CDMA2000, LTE, and various other 2G, 2.5G, 3G, 4G, 5G, 6G, and greater generation technology standards. Moreover, the communications component 918 may facilitate communications over various channel access methods (which may or may not be used by the aforementioned standards) including, but not limited to, TDMA, FDMA, W-CDMA, OFDM, SDMA, and the like.

In addition, the communications component 918 may facilitate data communications using GPRS, EDGE, the HSPA protocol family including HSDPA, EUL or otherwise termed HSUPA, HSPA+, and various other current and future wireless data access standards. In the illustrated embodiment, the communications component 918 can include a first transceiver ("TxRx") 920A that can operate in a first communications mode (e.g., GSM). The communications component 918 also can include an Nth transceiver ("TxRx") 920N that can operate in a second communications mode relative to the first transceiver 920A (e.g., UMTS). While two transceivers 920A-N(hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, orientation sensors, noise sensors, proximity sensors, or the like. As such, it should be understood that the sensors 924 can include, but are not limited to, accelerometers, magnetometers, gyroscopes, infrared sensors, noise sensors, microphones, combinations thereof, or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another mobile device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from global positioning system ("GPS") devices, assisted-GPS ("A-GPS") devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

Figure 10:
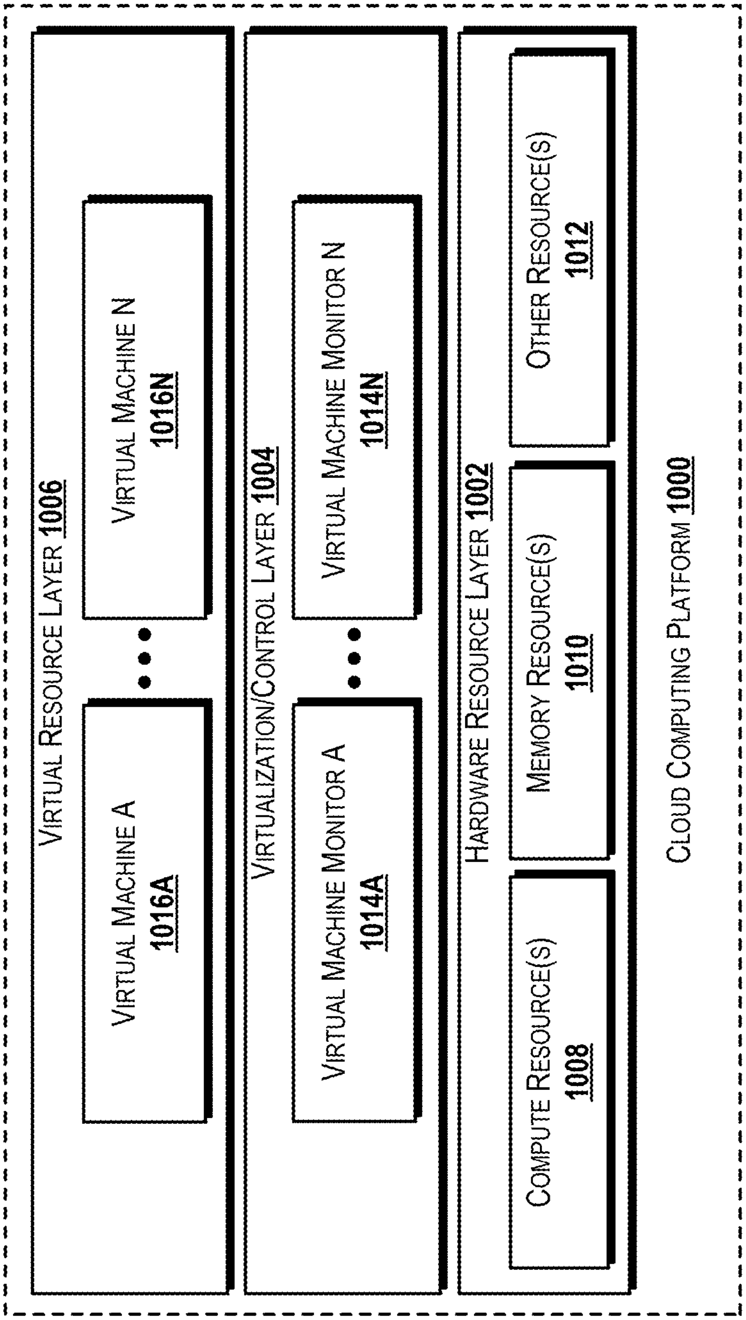
FIG. 10 is a diagram illustrating a computing environment capable of implementing aspects of the concepts and technologies disclosed herein, according to some illustrative embodiments of the concepts and technologies described herein.

FIG. 10 illustrates an illustrative architecture for a cloud computing platform 1000 that can be capable of executing the software components described herein for providing application-level content control for direct-to-cell satellite coverage and/or for interacting with the coverage management application 108 and/or the coverage management service 114. Thus, it can be appreciated that in some embodiments of the concepts and technologies disclosed herein, the cloud computing platform 1000 illustrated in FIG. 10 can be used to provide the functionality described herein with respect to the user device 102, the server computer 116, the data store 122, and/or the application server 124.

The cloud computing platform 1000 thus may be utilized to execute any aspects of the software components presented herein. Thus, according to various embodiments of the concepts and technologies disclosed herein, the coverage management application 108, the coverage management service 114, and/or the application 126 can be implemented, at least in part, on or by elements included in the cloud computing platform 1000 illustrated and described herein. Those skilled in the art will appreciate that the illustrated cloud computing platform 1000 is a simplification of but only one possible implementation of an illustrative cloud computing platform, and as such, the illustrated cloud computing platform 1000 should not be construed as being limiting in any way.

In the illustrated embodiment, the cloud computing platform 1000 can include a hardware resource layer 1002, a virtualization/control layer 1004, and a virtual resource layer 1006. These layers and/or other layers can be configured to cooperate with each other and/or other elements of a cloud computing platform 1000 to perform operations as will be described in detail herein. While connections are shown between some of the components illustrated in FIG. 10, it should be understood that some, none, or all of the components illustrated in FIG. 10 can be configured to interact with one another to carry out various functions described herein. In some embodiments, the components are arranged so as to communicate via one or more networks such as, for example, the network 104 illustrated and described hereinabove (not shown in FIG. 10). Thus, it should be understood that FIG. 10 and the following description are intended to provide a general understanding of a suitable environment in which various aspects of embodiments can be implemented, and should not be construed as being limiting in any way.

The hardware resource layer 1002 can provide hardware resources. In the illustrated embodiment, the hardware resources can include one or more compute resources 1008, one or more memory resources 1010, and one or more other resources 1012. The compute resource(s) 1008 can include one or more hardware components that can perform computations to process data, and/or to execute computer-executable instructions of one or more application programs, operating systems, services, and/or other software including, but not limited to, the coverage management application 108, the coverage management service 114, and/or the application 126 illustrated and described herein.

According to various embodiments, the compute resources 1008 can include one or more central processing units ("CPUs"). The CPUs can be configured with one or more processing cores. In some embodiments, the compute resources 1008 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 1008 can include one or more discrete GPUs. In some other embodiments, the compute resources 1008 can include one or more CPU and/or GPU components that can be configured in accordance with a co-processing CPU/GPU computing model. Thus, it can be appreciated that in some embodiments of the compute resources 1008, a sequential part of an application can execute on a CPU and a computationally-intensive part of the application can be accelerated by the GPU. It should be understood that this example is illustrative, and therefore should not be construed as being limiting in any way.

In some embodiments, the compute resources 1008 also can include one or more system on a chip ("SoC") components. It should be understood that an SoC component can operate in association with one or more other components as illustrated and described herein, for example, one or more of the memory resources 1010 and/or one or more of the other resources 1012. In some embodiments in which an SoC component is included, the compute resources 1008 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 1008 can be or can include one or more hardware components arranged in accordance with an ARM architecture, available for license from ARM HOLDINGS of Cambridge, United Kingdom. Alternatively, the compute resources 1008 can be or can include one or more hardware components arranged in accordance with an x86 architecture, such as an architecture available from INTEL CORPORATION of Mountain View, California, and others. Those skilled in the art will appreciate the implementation of the compute resources 1008 can utilize various computation architectures and/or processing architectures. As such, the various example embodiments of the compute resources 1008 as mentioned hereinabove should not be construed as being limiting in any way. Rather, implementations of embodiments of the concepts and technologies disclosed herein can be implemented using compute resources 1008 having any of the particular computation architecture and/or combination of computation architectures mentioned herein as well as other architectures.

Although not separately illustrated in FIG. 10, it should be understood that the compute resources 1008 illustrated and described herein can host and/or execute various services, applications, portals, and/or other functionality illustrated and described herein. Thus, the compute resources 1008 can host and/or can execute the coverage management application 108, the coverage management service 114, the application 126, or other applications or services illustrated and described herein.

The memory resource(s) 1010 can include one or more hardware components that can perform or provide storage operations, including temporary and/or permanent storage operations. In some embodiments, the memory resource(s) 1010 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 1008, subject to the definition of "computer storage media" provided above (e.g., as excluding waves and signals per se and/or communication media as defined in this application).

Although not illustrated in FIG. 10, it should be understood that the memory resources 1010 can host or store the various data illustrated and described herein including, but not limited to, the device data 118, the user profiles 120, the content communications 128, the application communications 130, and/or other data, if desired. It should be understood that this example is illustrative, and therefore should not be construed as being limiting in any way. The other resource(s) 1012 can include any other hardware resources that can be utilized by the compute resources(s) 1008 and/or the memory resource(s) 1010 to perform operations. The other resource(s) 1012 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 1002 can be virtualized by one or more virtual machine monitors ("VMMs") 1014A-1014N (also known as "hypervisors;" hereinafter "VMMs 1014"). The VMMs 1014 can operate within the virtualization/control layer 1004 to manage one or more virtual resources that can reside in the virtual resource layer 1006. The VMMs 1014 can be or can include software, firmware, and/or hardware that alone or in combination with other software, firmware, and/or hardware, can manage one or more virtual resources operating within the virtual resource layer 1006.

The virtual resources operating within the virtual resource layer 1006 can include abstractions of at least a portion of the compute resources 1008, the memory resources 1010, the other resources 1012, or any combination thereof. These abstractions are referred to herein as virtual machines ("VMs"). In the illustrated embodiment, the virtual resource layer 1006 includes VMs 1016A-1016N (hereinafter "VMs 1016").

Based on the foregoing, it should be appreciated that systems and methods for providing application-level content control for direct-to-cell satellite coverage have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising:

a processor; and a memory that stores computer-executable instructions that, when executed by the processor, cause the processor to perform operations comprising:

receiving a content delivery request comprising a request to provide content associated with an application to a user device, wherein the application is hosted by an application server;

obtaining a user profile associated with the user device, wherein the user profile comprises content rules that define how the content associated with the application is delivered to the user device when the user device is connected to a direct-to-cell satellite network connection;

determining, based on the user profile, that the user device is connected to the direct-to-cell satellite network connection;

determining, based on the user profile, if the content associated with the application is high priority content; and if a determination is made that the content is the high priority content, determining content delivery parameters based on the content rules, wherein the content delivery parameters comprise delivering the content associated with the application in an original format or in a modified format, and delivering the content associated with the application to the user device while the user device is connected to the direct-to-cell satellite network connection.

2. The system of claim 1, wherein the computer-executable instructions, when executed by the processor, cause the processor to perform operations further comprising:

if a determination is made that the content is not the high priority content, applying the content rules to the content associated with the application and managing delivery of the content associated with the application based on the content rules, wherein managing the delivery of the content comprises delaying the delivery of the content until the user device is connected to a new network connection in addition to or instead of the direct-to-cell satellite network connection.

3. The system of claim 1, wherein the content comprises video, and wherein the modified format comprises a trimmed video or a cropped video.

4. The system of claim 1, wherein the content comprises video, and wherein the modified format comprises a single frame of the video.

5. The system of claim 1, wherein the computer-executable instructions, when executed by the processor, cause the processor to perform operations further comprising:

obtaining, from the user device, device data that comprises identity data that identifies the user device and connection data that identifies a current network connection of the user device, wherein the connection data indicates that the user device currently has limited network connectivity and is connected to the direct-to-cell satellite network connection; and generating, based on the device data, the user profile, wherein the user profile comprises the content rules and an application profile that defines content delivery for the application.

6. The system of claim 1, wherein determining the content delivery parameters comprises:

providing, to the user device, a notification that the content is not to be delivered to the user device when the user device is connected to the direct-to-cell satellite network connection, wherein the user device generates and presents a user interface at the user device based on the notification and obtains input via the user interface; and obtaining, from the user device, the input, wherein the input is used to determine the content delivery parameters, and wherein the content delivery parameters comprise blocking delivery of the content associated with the application, delaying delivery of the content associated with the application, or modifying the content associated with the application before delivery to the user device.

7. The system of claim 1, wherein the computer-executable instructions, when executed by the processor, cause the processor to perform operations further comprising:

obtaining, from a server computer, the content delivery request, wherein the content delivery request is received at the server computer from the user device; and requesting, from the server computer, the user profile and receiving the user profile in response to requesting the user profile.

8. A method comprising:

receiving, at a processor, a content delivery request comprising a request to provide content associated with an application to a user device, wherein the application is hosted by an application server;

obtaining, by the processor, a user profile associated with the user device, wherein the user profile comprises content rules that define how the content associated with the application is delivered to the user device when the user device is connected to a direct-to-cell satellite network connection;

determining, by the processor and based on the user profile, that the user device is connected to the direct-to-cell satellite network connection;

determining, by the processor and based on the user profile, if the content associated with the application is high priority content; and if a determination is made that the content is the high priority content, determining, by the processor, content delivery parameters based on the content rules, wherein the content delivery parameters comprise delivering the content associated with the application in an original format or in a modified format, and delivering, by the processor, the content associated with the application to the user device while the user device is connected to the direct-to-cell satellite network connection.

9. The method of claim 8, further comprising:

if a determination is made that the content is not the high priority content, applying the content rules to the content associated with the application and managing delivery of the content associated with the application based on the content rules, wherein managing the delivery of the content comprises delaying the delivery of the content until the user device is connected to a new network connection in addition to or instead of the direct-to-cell satellite network connection.

10. The method of claim 8, wherein the content comprises video, and wherein the modified format comprises a trimmed video, a cropped video, or a single frame of the video.

11. The method of claim 8, further comprising:

obtaining, from the user device, device data that comprises identity data that identifies the user device and connection data that identifies a current network connection of the user device, wherein the connection data indicates that the user device currently has limited network connectivity and is connected to the direct-to-cell satellite network connection; and generating, based on the device data, the user profile, wherein the user profile comprises the content rules and an application profile that defines content delivery for the application.

12. The method of claim 8, wherein determining the content delivery parameters comprises:

providing, to the user device, a notification that the content is not to be delivered to the user device when the user device is connected to the direct-to-cell satellite network connection, wherein the user device generates and presents a user interface at the user device based on the notification and obtains input via the user interface; and obtaining, from the user device, the input, wherein the input is used to determine the content delivery parameters, and wherein the content delivery parameters comprise blocking delivery of the content associated with the application, delaying delivery of the content associated with the application, or modifying the content associated with the application before delivery to the user device.

13. The method of claim 8, further comprising:

obtaining, from a server computer, the content delivery request, wherein the content delivery request is received at the server computer from the user device; and requesting, from the server computer, the user profile and receiving the user profile in response to requesting the user profile.

14. A computer storage medium comprising:

a processor; and a memory that stores computer-executable instructions that, when executed by the processor, cause the processor to perform operations comprising:

receiving a content delivery request comprising a request to provide content associated with an application to a user device, wherein the application is hosted by an application server;

obtaining a user profile associated with the user device, wherein the user profile comprises content rules that define how the content associated with the application is delivered to the user device when the user device is connected to a direct-to-cell satellite network connection;

determining, based on the user profile, that the user device is connected to the direct-to-cell satellite network connection;

determining, based on the user profile, if the content associated with the application is high priority content; and if a determination is made that the content is the high priority content, determining content delivery parameters based on the content rules, wherein the content delivery parameters comprise delivering the content associated with the application in an original format or in a modified format, and delivering the content associated with the application to the user device while the user device is connected to the direct-to-cell satellite network connection.

15. The computer storage medium of claim 14, wherein the computer-executable instructions, when executed by the processor, cause the processor to perform operations further comprising:

if a determination is made that the content is not the high priority content, applying the content rules to the content associated with the application and managing delivery of the content associated with the application based on the content rules, wherein managing the delivery of the content comprises delaying the delivery of the content until the user device is connected to a new network connection in addition to or instead of the direct-to-cell satellite network connection.

16. The computer storage medium of claim 14, wherein the content comprises video, and wherein the modified format comprises a trimmed video, a cropped video, or a single frame of the video.

17. The computer storage medium of claim 14, wherein the computer-executable instructions, when executed by the processor, cause the processor to perform operations further comprising:

obtaining, from the user device, device data that comprises identity data that identifies the user device and connection data that identifies a current network connection of the user device, wherein the connection data indicates that the user device currently has limited network connectivity and is connected to the direct-to-cell satellite network connection; and generating, based on the device data, the user profile, wherein the user profile comprises the content rules and an application profile that defines content delivery for the application.

18. The computer storage medium of claim 14, wherein determining the content delivery parameters comprises:

providing, to the user device, a notification that the content is not to be delivered to the user device when the user device is connected to the direct-to-cell satellite network connection, wherein the user device generates and presents a user interface at the user device based on the notification and obtains input via the user interface; and obtaining, from the user device, the input, wherein the input is used to determine the content delivery parameters, and wherein the content delivery parameters comprise blocking delivery of the content associated with the application, delaying delivery of the content associated with the application, or modifying the content associated with the application before delivery to the user device.

19. The computer storage medium of claim 14, wherein determining the content delivery parameters comprises:

providing, to the user device, a notification that the content is not to be delivered to the user device when the user device is connected to the direct-to-cell satellite network connection, wherein the user device generates and presents a user interface at the user device based on the notification and obtains input via the user interface; and obtaining, from the user device, the input, wherein the input is used to determine the content delivery parameters, and wherein the content delivery parameters comprise blocking delivery of the content associated with the application and informing an entity that attempted to send the content to the user device that the user device is connected to the direct-to-cell satellite network connection.

20. The computer storage medium of claim 14, wherein the computer-executable instructions, when executed by the processor, cause the processor to perform operations further comprising:

obtaining, from a server computer, the content delivery request, wherein the content delivery request is received at the server computer from the user device; and requesting, from the server computer, the user profile and receiving the user profile in response to requesting the user profile.

* * * * *